United States Patent
Ogata et al.

(10) Patent No.: US 11,848,413 B2
(45) Date of Patent: Dec. 19, 2023

(54) ANODE-FREE SOLID-STATE BATTERY CELLS WITH ANTI-DENDRITE AND INTERFACE ADHESION CONTROLLED FUNCTIONAL LAYERS

(71) Applicant: TeraWatt Technology Inc., Santa Clara, CA (US)

(72) Inventors: Ken Ogata, Tokyo (JP); Hiroshi Imoto, Tokyo (JP)

(73) Assignee: Terawatt Technology Inc., Santa Clara, CA (US)

( * ) Notice: Subject to any disclaimer, the term of this patent is extended or adjusted under 35 U.S.C. 154(b) by 197 days.

(21) Appl. No.: 17/222,716

(22) Filed: Apr. 5, 2021

(65) Prior Publication Data

US 2021/0226249 A1 Jul. 22, 2021

Related U.S. Application Data

(63) Continuation of application No. 16/209,828, filed on Dec. 4, 2018, now Pat. No. 11,024,877.

(51) Int. Cl.
| | |
|---|---|
| *H01M 10/0562* | (2010.01) |
| *H01M 10/0525* | (2010.01) |
| *H01M 10/0585* | (2010.01) |
| *H01M 50/44* | (2021.01) |
| *H01M 50/431* | (2021.01) |
| *H01M 50/437* | (2021.01) |
| *H01M 50/434* | (2021.01) |

(52) U.S. Cl.
CPC ... *H01M 10/0562* (2013.01); *H01M 10/0525* (2013.01); *H01M 10/0585* (2013.01); *H01M 50/44* (2021.01); *H01M 50/434* (2021.01); *H01M 50/437* (2021.01); *H01M 2300/0065* (2013.01)

(58) Field of Classification Search
CPC ......... H01M 10/0562; H01M 10/0525; H01M 10/0585; H01M 50/44; H01M 50/434; H01M 50/437; H01M 2300/0065; H01M 4/134; H01M 10/049; H01M 10/446; H01M 4/0423; H01M 4/0426; H01M 4/0428; H01M 4/133; H01M 4/587; H01M 4/62; H01M 4/622; H01M 4/625; H01M 10/0587; H01M 10/058; H01M 10/4235; H01M 10/052; H01M 2220/20; H01M 2300/0068; H01M 2300/0082; H01M 50/249; H01M 50/431; H01M 10/0565; Y02P 70/50; B60L 50/66; B60L 50/64; Y02T 10/70; Y02E 60/10; B60Y 2200/91

See application file for complete search history.

(56) References Cited

U.S. PATENT DOCUMENTS

| | | | |
|---|---|---|---|
| 11,024,877 B2 | 6/2021 | Ogata et al. | |
| 2002/0012846 A1* | 1/2002 | Skotheim | H01M 50/46 429/231.95 |
| 2007/0221265 A1* | 9/2007 | Affinito | H01M 4/628 136/243 |
| 2009/0148769 A1* | 6/2009 | Volkov | H01M 4/1393 156/64 |
| 2014/0329120 A1* | 11/2014 | Cui | H01M 50/449 429/90 |
| 2016/0301078 A1 | 10/2016 | Zhamu et al. | |
| 2016/0344035 A1* | 11/2016 | Zhamu | H01M 4/366 |
| 2017/0244093 A1 | 8/2017 | Fan | |
| 2017/0324111 A1 | 11/2017 | Schumann et al. | |
| 2017/0338465 A1 | 11/2017 | Holme et al. | |
| 2018/0069280 A1 | 3/2018 | Mastrandrea et al. | |
| 2019/0280272 A1* | 9/2019 | Okochi | H01M 10/30 |
| 2020/0227757 A1* | 7/2020 | Imai | H01M 10/39 |

FOREIGN PATENT DOCUMENTS

| | | |
|---|---|---|
| EP | 3244471 A1 | 11/2017 |
| KR | 10-2018-0036600 A | 4/2018 |
| WO | 2012/174393 A1 | 12/2012 |

OTHER PUBLICATIONS

European Search Report for EP 20730550 dated Aug. 10, 2022, 9 pages.
International Search Report and Written Opinion dated May 8, 2020 in related application No. PCT/IB2020/050804, all pgs.

* cited by examiner

*Primary Examiner* — Muhammad S Siddiquee
(74) *Attorney, Agent, or Firm* — Kilpatrick Townsend & Stockton LLP

(57) ABSTRACT

Provided herein are various battery cell embodiments. A battery cell can have a solid electrolyte. The electrolyte can be arranged within the cavity. The battery cell can have a cathode disposed within the cavity along a first side of the electrolyte. The battery cell can have a functional layer disposed within the cavity along a second side of the electrolyte. A first side of the functional layer can be in contact with a second side of the electrolyte. The functional layer can form an alloy with lithium material received via the electrolyte. The battery cell can have a scaffold layer disposed within the cavity along a second side of the functional layer.

20 Claims, 12 Drawing Sheets

ANODE-FREE SOLID-STATE BATTERY CELLS WITH ANTI-DENDRITE AND INTERFACE ADHESION CONTROLLED FUNCTIONAL LAYERS

CROSS-REFERENCE TO RELATED APPLICATIONS

This application is a continuation of U.S. patent application Ser. No. 16/209,828, filed Dec. 4, 2018, the full disclosure of which is incorporated herein by reference.

BACKGROUND

Batteries can include electrochemical cells to supply electrical power to various electrical components connected thereto.

SUMMARY

The present disclosure is directed to batteries cells for battery packs. The battery cell can be an anode-free, rechargeable battery cell with an anti-dendrite functional layer and a scaffold layer. Both the anti-dendrite functional layer and the scaffold layer can be situated between an electrolyte layer and a conductive layer in the battery cell. The anti-dendrite functional layer can have a higher interfacial adhesion to the electrolyte layer than to the conductive layer. During the operation of the battery cell, the anti-dendrite functional layer can bond with lithium ions transferred from the cathode layer through the electrolyte layer to form an alloy with the lithium material. The inclusion of the anti-dendrite functional layer can improve the operation and endurance of the battery cell by preventing dendritic growth of the lithium into the electrolyte layer. The higher interfacial adhesion with the electrolyte layer can guide lithium plating to the interface with conductive layer, thereby spatially restricting dendritic lithium growth from the electrolyte layer and cathode layer.

At least one aspect is directed to an apparatus to power electric vehicles. The apparatus can include a battery pack. The battery pack can be disposed in an electric vehicle to power the electric vehicle. The apparatus can include a battery cell. The battery cell arranged in the battery pack. The battery cell can have a housing that defines a cavity within the housing of the battery cell. The battery cell can have a solid electrolyte. The solid electrolyte can have a first side and a second side to transfer ions between the first side and the second side. The solid electrolyte can be arranged within the cavity. The battery cell can have a cathode. The cathode can be disposed within the cavity along the first side of the solid electrolyte. The cathode can be electrically coupled with a positive terminal. The battery cell can have an anti-dendrite functional layer. The anti-dendrite functional layer can be disposed within the cavity along the second side of the solid electrolyte. The anti-dendrite functional layer can have a first side and a second side. The first side of the anti-dendrite functional layer can be in contact with the second side of the solid electrolyte. The anti-dendrite functional layer can form an alloy with lithium material received via the solid electrolyte. The battery cell can have a scaffold layer. The scaffold layer can be disposed within the cavity along the second side of the anti-dendrite functional layer. The scaffold layer can be electrically coupled with a negative terminal.

At least one aspect is directed to a method of providing battery cells to power electric vehicles. The method can include disposing a battery pack in an electric vehicle to power the electric vehicle. The method can include arranging, in the battery pack, a battery cell having a housing that defines a cavity within the housing of the battery cell. The method can include arranging, within the cavity, a solid electrolyte having a first side and a second side to transfer ions between the first side and the second side. The method can include disposing, within the cavity along the first side of the solid electrolyte, a cathode electrically coupled with a positive terminal. The method can include disposing, within the cavity along the second side of the solid electrolyte, an anti-dendrite functional layer having a first side and a second side. The first side of the anti-dendrite functional layer can be in contact with the second side of the solid electrolyte. The anti-dendrite functional layer can form an alloy with lithium material received via the solid electrolyte. The method can include disposing, within the cavity along the second side of the anti-dendrite functional layer, a scaffold layer electrically coupled with a negative terminal.

At least one aspect is directed to an electric vehicle. The electric vehicle can include one or more components. The electric vehicle can include a battery pack. The battery pack can be disposed in an electric vehicle to power the one or more component. The electric vehicle can include a battery cell. The battery cell arranged in the battery pack. The battery cell can have a housing that defines a cavity within the housing of the battery cell. The battery cell can have a solid electrolyte. The solid electrolyte can have a first side and a second side to transfer ions between the first side and the second side. The solid electrolyte can be arranged within the cavity. The battery cell can have a cathode. The cathode can be disposed within the cavity along the first side of the solid electrolyte. The cathode can be electrically coupled with a positive terminal. The battery cell can have an anti-dendrite functional layer. The anti-dendrite functional layer can be disposed within the cavity along the second side of the solid electrolyte. The anti-dendrite functional layer can have a first side and a second side. The first side of the anti-dendrite functional layer can be in contact with the second side of the solid electrolyte. The anti-dendrite functional layer can form an alloy with lithium material received via the solid electrolyte. The battery cell can have a scaffold layer. The scaffold layer can be disposed within the cavity along the second side of the anti-dendrite functional layer. The scaffold layer can be electrically coupled with a negative terminal.

At least one aspect is directed to a method. The method can include providing an apparatus. The apparatus can be included in an electric vehicle. The apparatus can include a battery pack. The battery pack can be disposed in an electric vehicle to power the electric vehicle. The apparatus can include a battery cell. The battery cell arranged in the battery pack. The battery cell can have a housing that defines a cavity within the housing of the battery cell. The battery cell can have a solid electrolyte. The solid electrolyte can have a first side and a second side to transfer ions between the first side and the second side. The solid electrolyte can be arranged within the cavity. The battery cell can have a cathode. The cathode can be disposed within the cavity along the first side of the solid electrolyte. The cathode can be electrically coupled with a positive terminal. The battery cell can have an anti-dendrite functional layer. The anti-dendrite functional layer can be disposed within the cavity along the second side of the solid electrolyte. The anti-dendrite functional layer can have a first side and a second side. The first side of the anti-dendrite functional layer can be in contact with the second side of the solid electrolyte.

The anti-dendrite functional layer can form an alloy with lithium material received via the solid electrolyte. The battery cell can have a scaffold layer. The scaffold layer can be disposed within the cavity along the second side of the anti-dendrite functional layer. The scaffold layer can be electrically coupled with a negative terminal.

At least one aspect is directed to a battery cell to power an electric vehicle. The battery cell can be disposed in a battery pack. The battery pack can be disposed in an electric vehicle to power the electric vehicle. The battery cell can have a housing that defines a cavity within the housing of the battery cell. The battery cell can have a solid electrolyte. The solid electrolyte can have a first side and a second side to transfer ions between the first side and the second side. The solid electrolyte can be arranged within the cavity. The battery cell can have a cathode. The cathode can be disposed within the cavity along the first side of the solid electrolyte. The cathode can be electrically coupled with a positive terminal. The battery cell can have an anti-dendrite functional layer. The anti-dendrite functional layer can be disposed within the cavity along the second side of the solid electrolyte. The anti-dendrite functional layer can have a first side and a second side. The first side of the anti-dendrite functional layer can be in contact with the second side of the solid electrolyte. The anti-dendrite functional layer can form an alloy with lithium material received via the solid electrolyte. The battery cell can have a scaffold layer. The scaffold layer can be disposed within the cavity along the second side of the anti-dendrite functional layer. The scaffold layer can be electrically coupled with a negative terminal These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
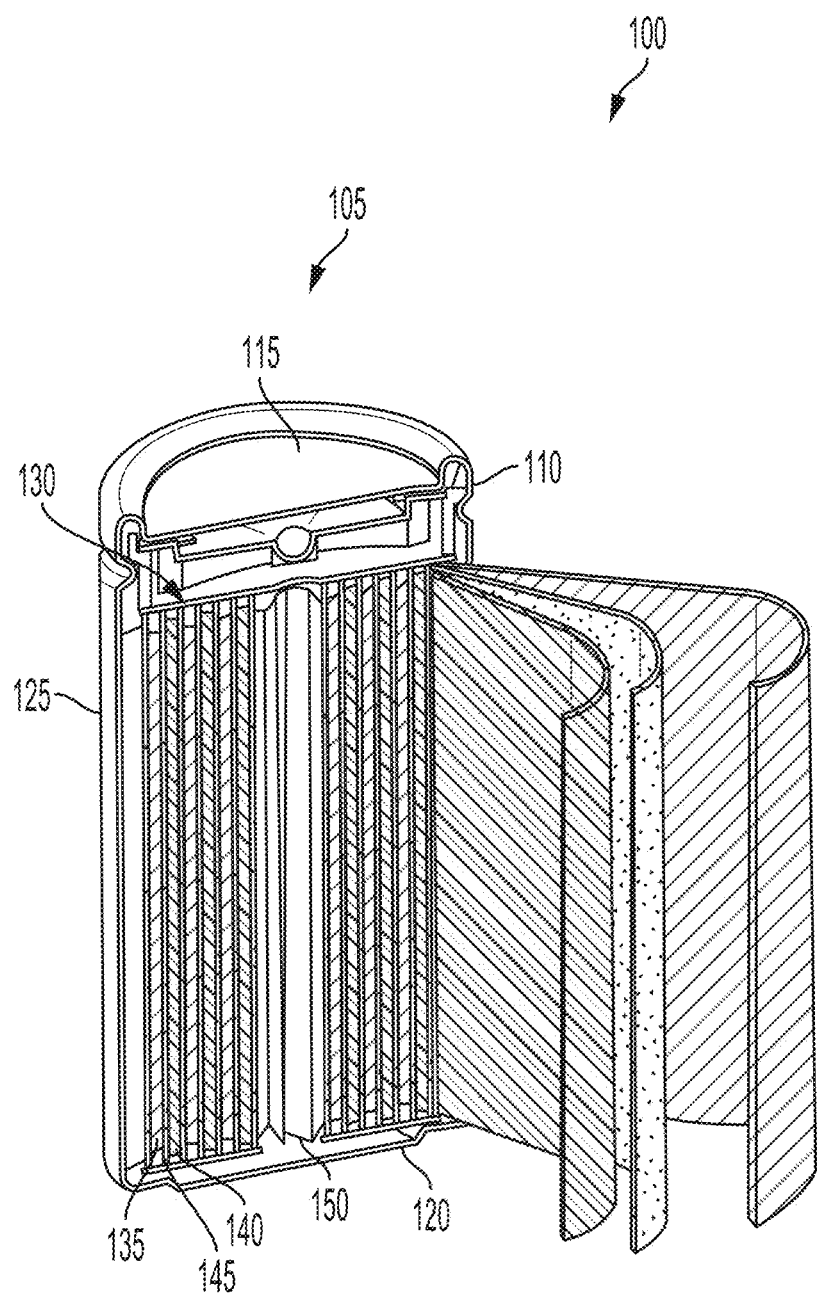
FIG. 1 is an isometric cross-sectional perspective of an example battery cell for powering electric vehicles.

Following below are more detailed descriptions of various concepts related to, and implementations of battery cells for battery packs in electric vehicles. The battery cell can be an anode-free solid-state lithium-ion battery with anti-dendrite and interface adhesion controlled functional layers. The various concepts introduced above and discussed in greater detail below can be implemented in any of numerous ways.

Described herein are battery cells for battery packs in electric vehicles for an automotive configuration. An automotive configuration includes a configuration, arrangement or network of electrical, electronic, mechanical or electro-mechanical devices within a vehicle of any type. An automotive configuration can include battery cells for battery packs in electric vehicles (EVs). EVs can include electric automobiles, cars, motorcycles, scooters, passenger vehicles, passenger or commercial trucks, and other vehicles such as sea or air transport vehicles, planes, helicopters, submarines, boats, or drones. EVs can be fully autonomous, partially autonomous, or unmanned.

Lithium-ion battery cells can be used in the electric vehicle to power the components therein. In lithium-ion battery cells, lithium ions can move from a positive electrode to a negative electrode during charging of the battery cell and move back from the negative electrode to the positive electrode during discharging of the battery cell. Each component of the lithium-ion battery cell can be comprised at least in part in lithium material. The cathode of the lithium-ion battery cell can be comprised of a lithium-based oxide material. The electrolyte of the lithium-ion battery cell can be a solid electrolyte containing lithium material. The anode of the lithium-ion battery cell can be comprised of lithium or graphite. The cathode and the anode can be arranged along opposite sides of the electrolyte within the battery cell. With iterative charging and discharging of the battery cell, lithium material transferred through the electrolyte can become accumulated in the anode of the battery cell, and with uneven distribution of the lithium material can result in dendritic growth into the electrolyte. Eventually, the dendritic growth of the lithium material from the anode can pierce through the electrolyte contacting the cathode, resulting in short circuiting and catastrophic failure of the battery cell.

One approach to alleviate the dendritic growth of the lithium material can involve arranging an organic buffer layer or an inorganic buffer layer between the electrolyte and the anode. The organic buffer layer and inorganic layer can transfer lithium ions from the electrolyte to anode, while maintaining the similar level of electrical impedance through the battery cell. The buffer layer can physically block the accumulation of lithium material to retain the lithium material in the anode. However, the obstruction of the lithium growth provided by the buffer layer can eventually fail. Organic or inorganic buffer layers still may not prevent dendritic growth, because such buffer layers may not take into account or counteract inhomogeneity of lithium transfer through the electrolyte and deposition onto the anode. The inhomogeneous or uneven distribution of lithium can become more problematic especially at faster charging rates. Hence, it may be difficult to suppress dendritic growth of lithium into the electrolyte using an organic or inorganic blocking layer between the anode and the electrolyte.

To resolve the technical challenges in dendritic growth of lithium materials in lithium-ion batteries, an anode-free solid-state lithium-ion battery cell with an anti-dendrite and interface adhesion controlled functional layer and a scaffold layer can be utilized. Both the anti-dendrite functional layer and the scaffold layer can be disposed and situated on a negative electrode side of the battery cell. The anti-dendrite functional layer can be arranged within the battery cell along the side of the electrolyte opposite of the cathode. The scaffold layer can be arranged between solid-state electrolyte and a conductive contact to convey the electrical current in or out of the battery cell. The anti-dendrite functional layer can be comprised of any stoichiometric combination of various elements, such as bismuth (Bi), tin (Sn), silicon (Si), silver (Au), gold (Ag), germanium (Ge), antimony (Se), selenium (Sb), lead (Pb), arsenic (As), phosphorous (P), sulfur (S), or platinum (Pt), among others. The anti-dendrite functional layer can form a bond or alloy with lithium materials received via the electrolyte. The anti-dendrite functional layer can also form a portion of the scaffold layer structure, with the material of the buffer layer dispersed at least partially into the scaffold layer structure. The anti-dendrite functional layer can be separated from and interfacing with the scaffold layer structure, and can be a single layer or a multi-layer structure.

During the initial charging process, the lithium ions from the cathode can migrate through the electrolyte and can reach the anti-dendrite functional layer and the scaffold layer structure on the other side. Upon the arrival of the lithium material at the anti-dendrite functional layer, the anti-dendrite functional layer can form an alloy with the lithium material to retain the lithium material therein. With the bonding of the lithium material with the buffer layer, the inter-diffusion buffer lay can function as a blocking layer to lower the likelihood of dendritic growth of the lithium as well as accelerator facilitating the diffusion of lithium ions through the electrolyte. In addition, any lithium material traversing through the anti-dendrite functional layer can be guided toward the interface between the scaffold layer structure and the conductive contact. The interfacial adhesion between an insulator (e.g., an organic or inorganic buffer layer) and the scaffold layer structure can be stronger than the interfacial adhesion between the scaffold layer structure and the conductive contact. As such, the lithium material received via the electrolyte can plate upon the interface between the scaffold layer structure and the conductive contact. Moreover, even with inhomogeneous distribution and concentration of the lithium material on the interface between the scaffold layer structure and conductive layer, any dendritic growth into the electrolyte can be prevented by the anti-dendrite functional layer.

FIG. 1, among others, depicts an isometric, cross-sectional view of a battery cell 105 for powering electric vehicles. The battery cell 105 can be part of a system or an apparatus 100 that can include at least one battery pack that include battery cells 105 to power components of electric vehicles. The battery cell 105 can be an anode-free lithium-ion battery cell to power electrical components. The electrical components can be part of an electric vehicle. The electrical components powered by the battery cell 105 can be those outside of the electric vehicle settings. The battery cell 105 can include a housing 110. The housing 110 can be contained in a battery module, a battery pack, or a battery array installed in an electric vehicle. The housing 110 can be of any shape. The shape of the housing 110 can be cylindrical with a circular (e.g., as depicted), elliptical, or ovular base, among others. The shape of the housing 110 can also be prismatic with a polygonal base, such as a triangle, a square, a rectangle, a pentagon, and a hexagon, among others. The housing 110 can have a length (or height) ranging between 65 mm to 125 mm. The housing 110 can have a width (or diameter in cylindrical examples as depicted) ranging between 18 mm to 45 mm. The housing 110 can have a thickness ranging between 100 mm to 200 mm.

The housing 110 of the battery cell 105 can include one or more materials with various electrical conductivity or thermal conductivity, or a combination thereof. The electrically conductive and thermally conductive material for the housing 110 of the battery cell 105 can include a metallic material, such as aluminum, an aluminum alloy with copper, silicon, tin, magnesium, manganese or zinc (e.g., of the aluminum 1000, 4000, or 5000 series), iron, an iron-carbon alloy (e.g., steel), silver, nickel, copper, and a copper alloy, among others. The electrically insulative and thermally conductive material for the housing 110 of the battery cell 105 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others.

The housing 110 of the battery cell 105 can have at least one lateral surface, such as a top surface 115 and a bottom surface 120. The top surface 115 can correspond to a top lateral side of the housing 110. The top surface 115 can be an integral portion of the housing 110. The top surface 115 can be separate from the housing 110, and added onto the top lateral side of the housing 110. The bottom surface 120 can correspond to a bottom lateral side of the housing 110, and can be on the opposite side of the top surface 115. The bottom surface 120 can correspond to a top lateral side of the housing 110. The bottom surface 120 can be an integral portion of the housing 110. The top surface 115 can be separate from the housing 110, and added onto the top lateral side of the housing 110. The housing 110 of the battery cell 105 can have at least one longitudinal surface, such as a sidewall 125. The sidewall 125 can extend between the top surface 115 and the bottom surface 120 of the housing 110. The sidewall 125 can have an indented portion (sometimes referred herein to as a neck or a crimped region) thereon. The top surface 115, the bottom surface 120, and the sidewall 125 can define a cavity 130 within the housing 110. The cavity 130 can correspond to an empty space, region, or volume within the housing 110 to hold content of the battery cell 105. The cavity 130 can span among the top surface 115, the bottom surface 120, and the sidewall 125 within the housing 110.

The battery cell 105 can include at least one cathode layer 135 (sometimes herein generally referred to as a cathode). The cathode layer 135 can be situated, arranged, or otherwise disposed within the cavity 130 defined by the housing 110. At least a portion of the cathode layer 135 can be in contact or flush within an inner side of the side wall 125. At least a portion of the cathode layer 135 can be in contact or flush with an inner side of the bottom surface 120. The cathode layer 135 can output conventional electrical current out from the battery cell 105 and can receive electrons during the discharging of the battery cell 105. The cathode layer 135 can also release lithium ions during the discharging of the battery cell 105. In contrast, the cathode layer 135 can receive conventional electrical current into the battery cell 105 and can output electrons during the charging of the battery cell 105. The cathode layer 135 can receive lithium ions during the charging of the battery cell 105. The cathode layer 135 can be comprised of a lithium-based oxide material or phosphate material. The cathode layer 135 can be comprised of lithium cobalt oxide ($LiCoO_2$), lithium iron phosphate ($LiFePO_4$), lithium manganese oxide ($LiMn_2O_4$), lithium nickel manganese cobalt oxide ($LiNi_xMn_yCo_zO_2$), and lithium nickel cobalt aluminum oxide ($LiNiCoAlO_2$), among other lithium-based materials. The cathode layer 135 can have a length (or height) ranging between 50 mm to 120 mm. The cathode layer 135 can have a width ranging between 50 mm to 2000 mm. The cathode layer 135 can have a thickness ranging between 1 μm to 200 μm. The areal loading of the cathode layer 135 can range between 0.3 gm/cm$^2$ to 60 mg/cm$^2$.

The battery cell 105 can be anode-free and can lack an active (or reactive) anode layer (sometimes herein generally referred to as an anode). In battery cells with anodes, the anode layer can be comprised of an active substance, such as Graphite (e.g., activated carbon or infused with conductive materials), lithium titanate ($Li_4Ti_5O_{12}$), or Silicon, among other materials. During the discharging of such battery cells, the anode layer can undergo oxidation, and can receive conventional electrical current into the battery cell and output electrons from the battery cell. At the same time, the cathode layer in such battery cells can undergo reduction and can output conventional electrical current from the battery cell and receive electrons into the battery cell. Conversely, during the charging of such battery cells, the anode layer can undergo reduction, and can output conventional electrical current from the battery cell and receive electrons into the battery cell. In addition, the cathode layer in such battery cells can undergo oxidation, and can receive conventional electrical current into the battery cell and output electrons from the battery cell.

The battery cell 105 can include at least one complex structure 140 (sometimes herein referred to as a passive layer, a non-active layer, a non-reactive layer, or an inter-diffusion layer) instead of an active anode layer. The complex structure 140 can be situated, arranged, or otherwise disposed within the cavity 130 defined by the housing 110. At least a portion of the complex structure 140 can be in contact or flush within an inner side of the side wall 125. At least a portion of the complex structure 140 can be in contact or flush with an inner side of the bottom surface 120. The complex structure 140 can provide a conveyance of conventional electrical current into the battery cell 105 during the discharging of the battery cell 105 and out of the battery cell 105 during the charging of the battery cell 105. In contrast to the anode layers of battery cells with anodes, the complex structure 140 of the battery cell 105 may not undergo oxidation or reduction during the operation of the battery cell 105. The complex structure 140 can have a length (or height) ranging between 50 mm to 120 mm. The complex structure 140 can have a width ranging between 50 mm to 2000 mm. The complex structure 140 can have a thickness ranging between 1 μm to 40 μm.

The battery cell 105 can include a solid electrolyte layer 145 (sometimes herein generally referred to as an electrolyte or a solid electrolyte). The solid electrolyte layer 145 can be situated, disposed, or otherwise arranged within the cavity 130 defined by the housing 110. At least a portion of the solid electrolyte layer 145 can be in contact or flush within an inner side of the side wall 125. At least a portion of the solid electrolyte layer 145 can be in contact or flush with an inner side of the bottom surface 120. The solid electrolyte layer 145 can be arranged between the complex structure 140 and the cathode layer 135 to separate the complex structure 140 and the cathode layer 135. The solid electrolyte layer 145 can transfer ions between the complex structure 140 and the cathode layer 135. The solid electrolyte layer 145 can transfer cations from the complex structure 140 to the cathode layer 135 during the operation of the battery cell 105. The solid electrolyte layer 145 can transfer anions (e.g., lithium ions) from the cathode layer 135 to the complex structure 140 during the operation of the battery cell 105. The solid electrolyte layer 145 can have a length (or height) ranging between 50 mm to 120 mm. The solid electrolyte layer 145 can have a width ranging between 50 mm to 2000 mm. The solid electrolyte layer 145 can have a thickness ranging between 1 μm to 200 μm.

The solid electrolyte layer 145 can be comprised of a solid electrolyte material. The solid electrolyte layer 145 can be comprised of a ceramic electrolyte material, such as lithium phosphorous oxy-nitride ($Li_xPO_yN_z$), lithium germanium phosphate sulfur ($Li_{10}GeP_2S_{12}$), Yttria-stabilized Zirconia (YSZ), NASICON ($Na_3Zr_2Si_2PO_{12}$), beta-alumina solid electrolyte (BASE), perovskite ceramics (e.g., strontium titanate ($SrTiO_3$)), among others. The solid electrolyte layer 145 can be comprised of a polymer electrolyte material (sometimes referred herein as a hybrid or pseudo-solid state electrolyte), such as polyacrylonitrile (PAN), polyethylene oxide (PEO), polymethyl-methacrylate (PMMA), and polyvinylidene fluoride (PVDF), among others. The solid electrolyte layer 145 can be comprised of a glassy electrolyte material, such as lithium sulfide-phosphor pentasulfide ($Li_2S$—$P_2S_5$), lithium sulfide-boron sulfide ($Li_2S$—$B_2S_3$), and Tin sulfide-phosphor pentasulfide (SnS—$P_2S_5$). The electrolyte material 145 can include any combination of the ceramic electrolyte material, the polymer electrolyte material, and the glassy electrolyte material, among others.

The battery cell 105 can include at least one center support 150. The center support 150 can be situated, arranged, or disposed within the cavity 130 defined by the housing 110. At least a portion of the center support 150 can be in contact or flush within an inner side of the side wall 125. At least a portion of the center support 150 can be in contact or flush with an inner side of the bottom surface 120. The center support 150 can be positioned in a hollowing defined by the complex structure 140, the cathode layer 135, or the solid electrolyte layer 145. The center support 150 in the hollowing can be any structure or member to wrap around the cathode layers 135, the complex structures 140, and the electrolyte layers 145 in stack formation. The center support 150 can include an electrically insulative material, and can function neither as the positive terminal nor the negative terminal for the battery cell 105. The battery cell 105 can also lack or not include the center support 150.

Figure 2:
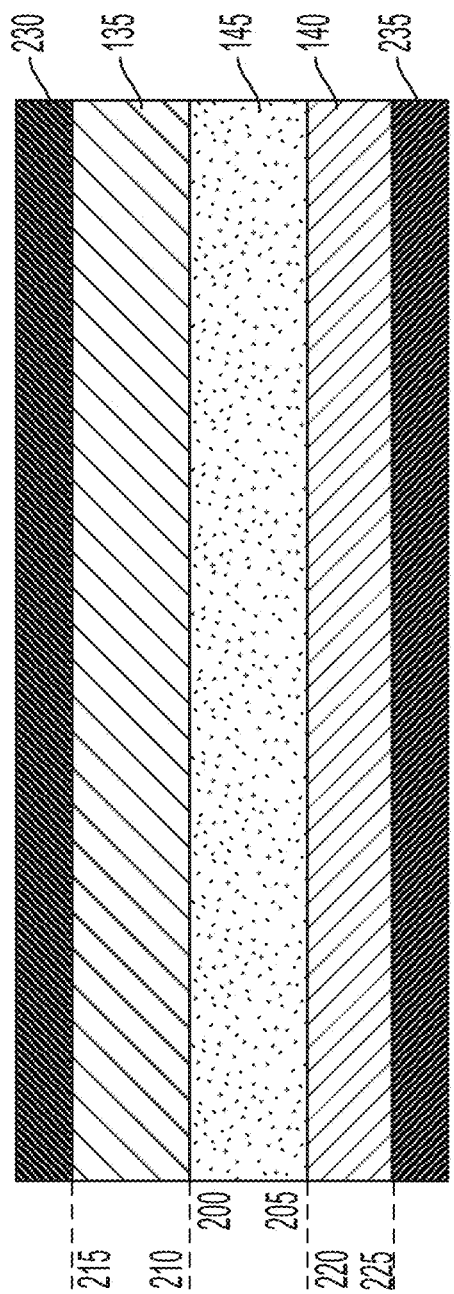
FIG. 2 is a cross-sectional view of an example battery cell for powering electric vehicles.

FIG. 2, among others, depicts a cross-sectional view of the battery cell 105 for powering electric vehicles. As illustrated, the at least one cathode layer 135, the at least one complex structure 140, and the at least one solid electrolyte layer 145 can be arranged within the cavity 130 in the housing 110 of the battery cell 105. The at least one cathode layer 135, the at least one complex structure 140, and the at least one solid electrolyte layer 145 can be arranged in succession, or interleaved. At least one of the cathode layers 135 and at least one of the complex structures 140 can be separated without a solid electrolyte between the cathode layer 135 and the complex structures 140. At least one of the cathode layers 135 and at least one of the complex structures 140 can be adjacent with each other. The set of cathode layers 135 and the set of complex structures 140 can be electrically coupled with one another in succession. Each cathode layer 135 can be electrically coupled with one of the complex structures 140. Each complex structure 140 can be electrically coupled with one of the cathode layers 135. Each cathode layer 135, each complex structure 140, each solid electrolyte layer 145 can be arranged longitudinally within the cavity 130. Each cathode layer 135, each complex structure 140, and each solid electrolyte layer 145 can at least partially extend from the bottom surface 120 to the top surface 115. Each cathode layer 135, each complex structure 140, each solid electrolyte layer 145 can be arranged laterally within the cavity 130. Each cathode layer 135, each complex structure 140, and each solid electrolyte layer 145 can at least partially extend from one side wall 125 to another side wall 125.

The solid electrolyte layer 145 can include at least one first side 200. The first side 200 can correspond to one surface (e.g., longitudinal or lateral) of the solid electrolyte layer 145. The first side 200 can correspond to the surface of the solid electrolyte layer 145 facing the cathode layer 135. The cathode layer 135 can be disposed within the cavity 130 at least partially along the first side 200 of the solid electrolyte layer 145. At least a portion of the first side 200 of the solid electrolyte layer 145 can be in contact or flush with at least one side of the cathode layer 135. The solid electrolyte layer 145 can be electrically coupled with the cathode layer 135 via the first side 200. During operation of the battery cell 105 (e.g., charging or discharging), the solid electrolyte layer 145 can receive lithium material from the cathode layer 135 via the first side 200. The lithium material released by the cathode layer 135 can move as cations through the solid electrolyte layer 145 toward the complex structure 140 on the other side of the solid electrolyte layer 145.

The solid electrolyte layer 145 can include at least one second side 205. The second side 205 can correspond to one surface (e.g., longitudinal or lateral) of the solid electrolyte layer 145. The second side 205 can be on the opposite side as the first side 200. The second side 205 can correspond to the surface facing the complex structure 140. The complex structure 140 can be disposed within the cavity 130 at least partially along the second side 205 of the solid electrolyte layer 145. At least a portion of the second side 205 of the solid electrolyte layer 145 can be in contact or flush with at least one side of the complex structure 140. During operation of the battery cell 105 (e.g., charging or discharging), the solid electrolyte layer 145 can transfer lithium material from the cathode layer 135 to the complex structure 140 via the second side 205. In battery cells without any buffer layer, the anode layer can undergo the dendritic growth of the lithium material as more and more lithium material is collected with repeated operation of the battery cell. The dendrite formation of the lithium material from the anode layer can eventually pierce through the electrolyte layer and reach the cathode layer, leading to short-circuiting of the battery cell.

The cathode layer 135 can include at least one first side 210. The first side 210 can correspond to one surface (e.g., longitudinal or lateral) of the cathode layer 135. The first side 210 of the cathode layer 135 can face the first side 200 of the solid electrolyte layer 145. At least a portion of the first side 210 of the cathode layer 135 can be in contact or flush with at least a portion of the first side 200 of the solid electrolyte layer 145. The first side 210 of the cathode layer 135 can interface with the first side 200 of the solid electrolyte layer 145. The cathode layer 135 can be electrically coupled with the solid electrolyte layer 145 via the first side 210. During operation of the battery cell 105 (e.g., charging or discharging), the cathode layer 135 can release lithium material into the solid electrolyte layer 145 via the first side 210. In addition, the cathode layer 135 can include at least one second side 215. The second side 215 can correspond to one surface (e.g., longitudinal or lateral) of the cathode layer 135. The second side 215 can be opposite of the first side 210 on the cathode layer 135. During discharging of the battery cell 105, the cathode layer 135 can receive electrons through the second side 215 and release conventional electrical current via the second side 215. During charging of the battery cell 105, the cathode layer 135 can release electrons through the second side 215 and can receive conventional electrical current via the second side 215.

The complex structure 140 can include at least one first side 220. The first side 220 can correspond to one surface (e.g., longitudinal or lateral) of the complex structure 140. The first side 220 of the complex structure 140 can face the second side 205 of the solid electrolyte layer 145. At least a portion of the first side 220 of the complex structure 140 can be in contact or flush with at least a portion of the second side 205 of the solid electrolyte layer 145. The first side 220 of the complex structure 140 can interface with the second side 205 of the solid electrolyte layer 145. The complex structure 140 can be electrically coupled with the solid electrolyte layer 145 via the first side 220. During operation of the battery cell 105 (e.g., charging or discharging), the complex structure 140 can receive the lithium material released by the cathode layer 135 from the solid electrolyte layer 145 via the first side 220. Furthermore, the complex structure 140 can include at least one second side 225. The second side 225 can be opposite of the first side 220 on the complex structure 140. During discharging of the battery cell 105, the complex structure 140 can release electrons through the second side 225 and receive conventional electrical current via the second side 225. Conversely, during charging of the battery cell 105, the complex structure 140 can receive electrons from the second side 225 and release conventional electrical current via the second side 225.

The battery cell 105 can include at least one positive conductive layer 230 (sometimes referred herein as a positive conductive plate or sheet). The positive conductive layer 230 can correspond to or define a positive terminal for the battery cell 105. The positive conductive layer 230 can be disposed or arranged within the cavity 130 in the housing 110 of the battery cell 105 along the second side 215 of the cathode layer 135. At least a portion of the positive conductive layer 230 can be in contact or flush with at least a portion of the second side 215 of the cathode layer 135. The positive conductive layer 230 can interface with the cathode layer 135 along the second side 215. The positive conductive layer 230 can be electrically coupled with the cathode layer 135 via the second side 215. Through the positive conductive layer 230, the cathode layer 135 can be electrically coupled with the positive terminal for the battery cell 105. The positive conductive layer 230 can be comprised of an electrically conductive material. The electrically conductive material for the positive conductive layer 230 can include a metallic material, such as nickel, copper, an aluminum alloy with copper, silicon, tin, magnesium, manganese or zinc (e.g., of the aluminum 1000, 4000, or 5000 series), iron, an iron-carbon alloy (e.g., steel), silver, and a copper alloy, among others. The electrically conductive material for the positive conductive layer 230 can also include carbon-based materials, such as graphite and carbon fiber, among others. During discharging of the battery cell 105, the positive conductive layer 230 can receive electrons into the battery cell 105 and release conventional electrical current from the battery cell 105. Conversely, during charging of the battery cell 105, the positive conductive layer 230 can release electrons from the battery cell 105 and receive conventional electrical current into the battery cell 105. The positive conductive layer 230 can have a length (or height) ranging between 50 mm to 120 mm. The positive conductive layer 230 can have a width ranging between 50 mm to 2000 mm. The positive conductive layer 230 can have a thickness ranging between 1-30 μm.

The battery cell 105 can include at least one negative conductive layer 235 (sometimes referred herein as a negative conductive plate or sheet). The negative conductive layer 235 can correspond to or define a negative terminal for the battery cell 105. The negative conductive layer 235 can be of the opposite polarity as the positive conductive layer 230. The negative conductive layer 235 can be disposed or arranged within the cavity 130 in the housing 110 of the battery cell 105 along the second side 225 of the complex structure 140. At least a portion of the negative conductive layer 235 can be in contact or flush with at least a portion of the second side 225 of the complex structure 140. The negative conductive layer 235 can interface with the complex structure 140 along the second side 225. The negative conductive layer 235 can be electrically coupled with the complex structure 140 via the second side 225. Through the negative conductive layer 235, the complex structure 140 can be electrically coupled with the negative terminal for the battery cell 105. The negative conductive layer 235 can be comprised of an electrically conductive material. The electrically conductive material for the negative conductive layer 235 can include a metallic material, such as nickel, copper, an aluminum alloy with copper, silicon, tin, magnesium, manganese or zinc (e.g., of the aluminum 1000, 4000, or 5000 series), iron, an iron-carbon alloy (e.g., steel), silver, and a copper alloy, among others. The electrically conductive material for the negative conductive layer 235 can also include carbon-based materials, such as graphite and carbon fiber, among others. During discharging of the battery cell 105, the negative conductive layer 235 can release electrons from the battery cell 105 and receive conventional electrical current from the battery cell 105. Conversely, during charging of the battery cell 105, the negative conductive layer 235 can receive electrons from the battery cell 105 and release conventional electrical current into the battery cell 105. The negative conductive layer 235 can have a length (or height) ranging between 50 mm to 120 mm. The negative conductive layer 235 can have a width ranging between 50 mm to 2000 mm. The negative conductive layer 235 can have a thickness ranging between 1-30 μm.

Figure 3:
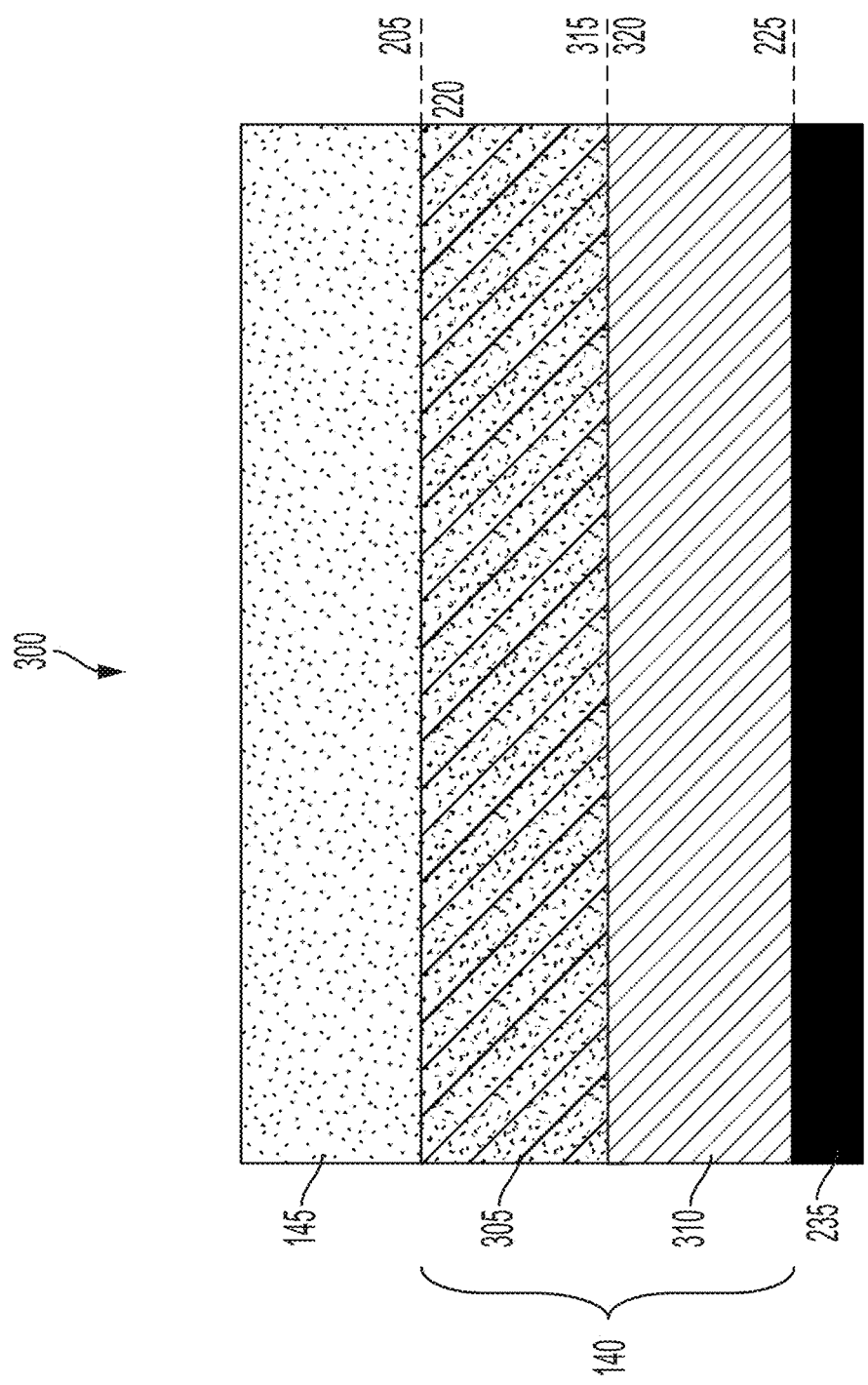
FIG. 3 is a cross-sectional view of an example layer pattern of a battery cell for powering electric vehicles.

FIG. 3, among others, depicts a cross-sectional view of a layer pattern 300 of the battery cell 105 for powering electric vehicles. As shown, in the layer pattern 300 for the battery cell 105, the complex structure 140 can include least one anti-dendrite functional layer 305 (sometimes referred herein as an electrolyte-interfacing inter-diffusion buffer layer or anti-dendrite and interface adhesion controller layer). In the layer pattern 300, the anti-dendrite functional layer 305 can be disposed or arranged within the cavity 130 of the housing 110 of the battery cell 105 along the second side 205 of the solid electrolyte layer 145. The anti-dendrite functional layer 305 can form or correspond to at least a portion of the complex structure 140 along the first side 220 of the complex structure 140. At least one side of the anti-dendrite functional layer 305 can include or can correspond to the first side 220 of the complex structure 140. The side of the anti-dendrite functional layer 305 corresponding to the first side 220 of the complex structure 140 can face the second side 205 of the solid electrolyte layer 145. At least a portion of the anti-dendrite functional layer 305 along the first side 220 can be in contact or flush with at least a portion of the second side 205 of the solid electrolyte layer 145. The anti-dendrite functional layer 305 can interface with the solid electrolyte layer 145 through the first side 220. The anti-dendrite functional layer 305 can bond with the solid electrolyte layer 145 via the first side 220. The anti-dendrite functional layer 305 can be electrically coupled with the solid electrolyte layer 145 through the first side 220. In addition, the anti-dendrite functional layer 305 can have at least one second side 315 (sometimes referred herein as an intermedial side). The second side 315 can correspond to one surface (e.g., longitudinal or lateral) of the solid electrolyte layer 145. The second side 315 of the anti-dendrite functional layer 305 can be opposite of the first side 220 in contact with the solid electrolyte layer 145. The anti-dendrite functional layer 305 can have a length (or height) ranging between 50 mm to 120 mm. The anti-dendrite functional layer 305 can have a width ranging between 50 mm to 2000 mm. The anti-dendrite functional layer 305 can have a thickness ranging between 0.01 μm and 10 μm. The thickness of the anti-dendrite functional layer 305 can correspond to a distance between the first side 220 and the second side 315.

The anti-dendrite functional layer 305 can be comprised of a metallic, semiconductor, or non-metallic material, such as bismuth (Bi), tin (Sn), silicon (Si), silver (Au), gold (Ag), germanium (Ge), antimony (Se), selenium (Sb), lead (Pb), arsenic (As), phosphorous (P), sulfur (S), or platinum (Pt), or any combination thereof, among others. The density of the material of the anti-dendrite functional layer 305 can range between 0.1 g/cc to 30 g/cc. The anti-dendrite functional layer 305 can also be comprised of inorganic or organic substances. The anti-dendrite functional layer 305 can be initially free of any lithium material prior to the first charging cycle of the battery cell 105. During operation of the battery cell 105 (e.g., discharging or charging), the anti-dendrite functional layer 305 can receive the lithium material transferred from the cathode layer 135 through the second side 205 of the solid electrolyte layer 145. The anti-dendrite functional layer 305 can bond or form an alloy with the lithium material received from the solid electrolyte layer 145. Via the formation of the alloy with the received lithium material, the anti-dendrite functional layer 305 can bond with the solid electrolyte layer 145 along the first side 220. The bonding of the lithium material with the anti-dendrite functional layer 305 can be independent of the inhomogeneity of the dispersal of the lithium material through the solid electrolyte layer 145. The alloy formed by the anti-dendrite functional layer 305 can include, for example, a binary alloy (e.g., lithium-bismuth (Li—Bi), lithium-tin (Li—Sn), or lithium-silicon (Li—Si)), a trinary alloy (e.g., lithium-bismuth-silicon (Li—Bi—Sn) or lithium-phosphorus-platinum (Li—P—Pt)), or quaternary alloy (e.g., lithium-silicon-germanium-antinomy (Li—Si—Ge—Se)), among any other combinations. By forming an alloy with the lithium material received from the solid electrolyte layer 145, the anti-dendrite functional layer 305 can prevent the dendritic growth of lithium into the solid electrolyte layer 145. In addition, because of the property of the anti-dendrite functional layer 305, the anti-dendrite functional layer 305 can accelerate the diffusion of lithium material transferred through the solid electrolyte layer 145.

In the layer pattern 300 for the battery cell 105, the complex structure 140 can include at least one scaffold layer 310 (sometimes referred herein as a carbon matrix structure, graphite matrix structure, or a framework structure). The scaffold layer 310 can be disposed or arranged within the cavity 130 of the housing 110 of the battery cell 105. The scaffold layer 310 can form or correspond to a portion of the complex structure 140 along the second side 225. At least one side of the scaffold layer 310 can include or can correspond to the second side 225 of the complex structure 140. The side of the scaffold layer 310 corresponding to the second side 225 of the complex structure 140 can face one side the negative conductive layer 235. At least a portion of the scaffold layer 310 along the second side 225 can be in contact or flush with at least a portion of one side of the negative conductive layer 235. The scaffold layer 310 can be mechanically coupled with the negative conductive layer 235 via the second side 225. The scaffold layer 310 can interface with the negative conductive layer 235 through the second side 225. The scaffold layer 310 can be electrically coupled with the negative conductive layer 235 through the second side 225.

In addition, the scaffold layer 310 can have at least one first side 320 (sometimes referred herein as an intermedial side). The first side 320 can correspond to one surface (e.g., longitudinal or lateral) of the solid electrolyte layer 145. The first side 320 of the scaffold layer 310 can be opposite of the first side 220 in contact with the solid electrolyte layer 145. At least a portion of the scaffold layer 310 along the first side 320 can be in contact or flush with at least a portion of the second side 315 of the anti-dendrite functional layer 305. The first side 320 of the scaffold layer 310 can be mechanically coupled with the anti-dendrite functional layer 305 through the second side 315. The first side 320 of the scaffold layer 310 can interface with the anti-dendrite functional layer 305 via the second side 315. The first side 320 of scaffold layer 310 can be mechanically coupled with the second side 315 of the anti-dendrite functional layer 305 (e.g., intermeshing, bonding, or connecting). Intermeshed or bonded, the first side 320 of the scaffold layer 310 can overlap with the second side 315 of the anti-dendrite functional layer 305, and vice-versa. The scaffold layer 310 can be electrically coupled with the anti-dendrite functional layer 305 via the first side 320 of the scaffold layer 310. The scaffold layer 310 can have a length (or height) ranging between 50 mm to 120 mm. The scaffold layer 310 can have a width ranging between 50 mm to 2000 mm. The scaffold layer 310 can have a thickness ranging between 1 μm and 30 μm. The thickness of the scaffold layer 310 can correspond to a distance between the first side 320 and second side 225. The thickness of the scaffold layer 310 can be greater the thickness of the anti-dendrite functional layer 305. A ratio between the thickness of the scaffold layer 310 and the thickness of the anti-dendrite functional layer 305 can range between 0 and 1000.

The scaffold layer 310 can be comprised of an organic material. The scaffold layer 310 can be comprised of a carbon-based composite material, such as carbon fiber, vitreous carbon, pyrolytic carbon, graphene, a graphite intercalation compound (GIC) among others. The carbon-based composite material can be comprised of carbon and a binding agent, such as polyvinylidene fluoride (PVDF), carboxymethylcellulose (CMC), styrene-butadiene rubber (SBR), and polymide (PI), among others. The porosity of the carbon-based composite material of the scaffold layer 310 can range between 1% to 99%. The scaffold layer 310 can be comprised of a metal-organic framework (MOF) or a covalent organic framework (COF). The scaffold layer 310 can be comprised of an inorganic material, such as a metal oxide or a metal-inorganic framework (MIF). The porosity of the inorganic material for the scaffold layer 310 can range between nanometers to micrometers. The scaffold layer 310 can be initially free of any lithium material prior to the first charging cycle of the battery cell 105. The material of the scaffold layer 310 can bond with the material of the anti-dendrite functional layer 305. For example, at least a portion of the material of the anti-dendrite functional layer 305 along the second side 315 can be intermeshed or intercalated with the carbon-based composite material of the scaffold layer 310 along the second side 320. As such, the boundary between the second side 315 of the anti-dendrite functional layer 305 and the second side 320 of the scaffold layer 310 can be a gradient.

During the charging of the battery cell 105, the lithium material received from the cathode layer 135 through the solid electrolyte layer 145 can bond with the anti-dendrite functional layer 305 or can traverse the scaffold layer 310. Due to the differences in materials, the interface adhesion between the first side 220 of the anti-dendrite functional layer 305 and the second side 205 of the electrolyte layer 145 can be stronger than the interface adhesion between the second side 225 of the scaffold layer 310 and the side of the negative conductive layer 235. Since the interface adhesion between the anti-dendrite functional layer 305 and the electrolyte 145 is stronger, the probability of the lithium material attaching along the second side 205 can be lower. Instead, the probability of the lithium material attaching along the second side 225 of the scaffold layer 310 can be higher. As such, rather than amassing on the first side 220 of the anti-dendrite functional layer 305, the lithium material can be guided through the scaffold layer 310 toward the negative conductive layer 235. The scaffold layer 310 can permit accumulation of the lithium material along the second side 225 during charging of the battery cell 105. As the lithium material is deposited further from the solid electrolyte layer 145, the likelihood of the growth of the lithium material penetrating into the solid electrolyte layer 145 can be reduced. Conversely, while discharging the battery cell 105, the lithium material can move away from the negative conductive layer 235 back toward the anti-dendrite functional layer 305. The scaffold layer 310 can permit dispersal or stripping of the lithium material accumulated along the second side 225 of the complex structure 140 during discharging of the battery cell 105. In this manner, plating of the lithium material received at the complex structure 140 can be restricted by the scaffold layer 310 toward the second side 225.

Figure 4:
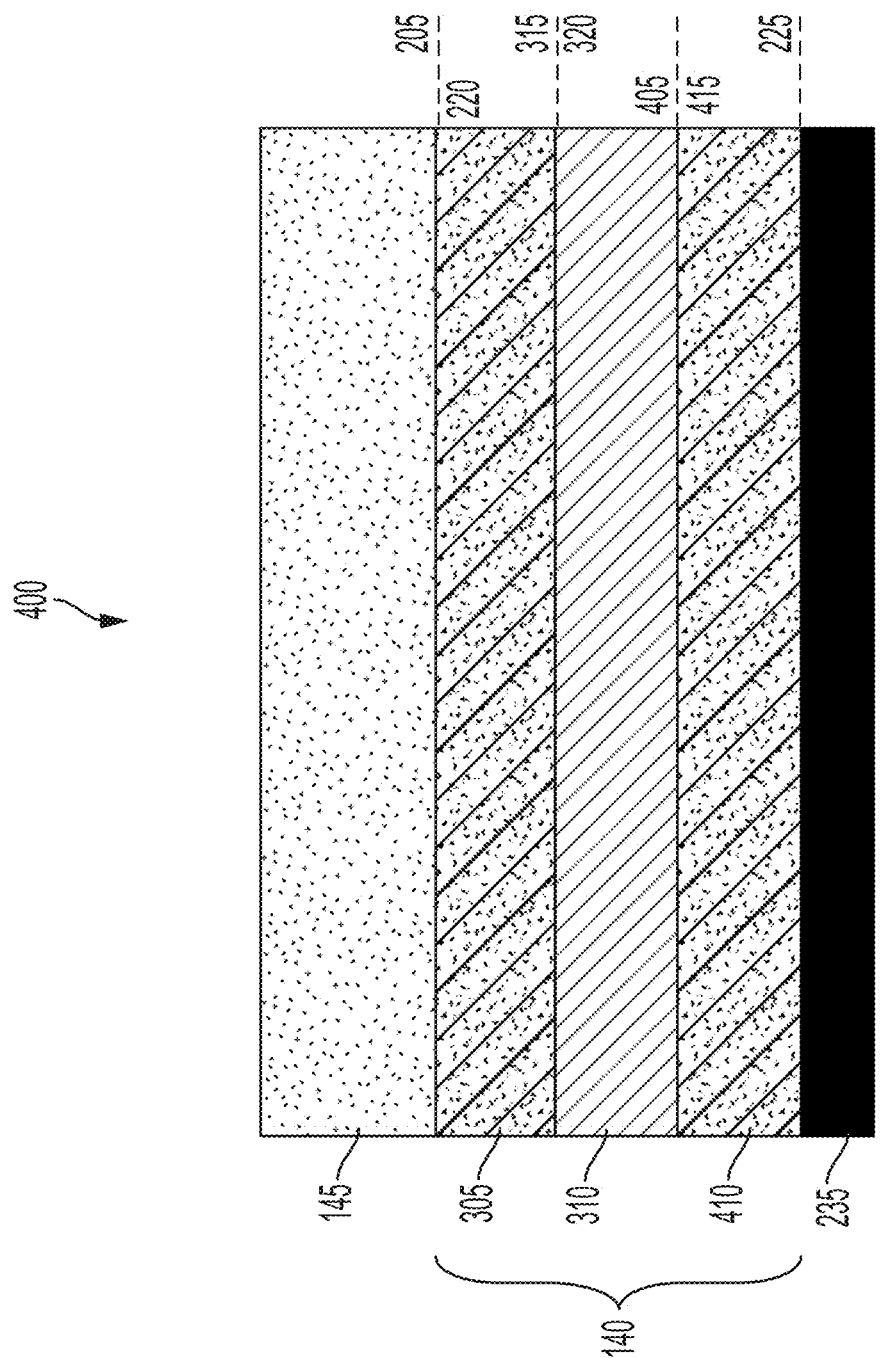
FIG. 4 is a cross-sectional view of an example layer pattern of a battery cell for powering electric vehicles.

FIG. 4, among others, depicts a cross-sectional view of a layer pattern 400 of the battery cell 105 for powering electric vehicles. As shown, the complex structure 140 in the layer pattern 400 for the battery cell 105 can include the anti-dendrite functional layer 305 and the scaffold layer 310. In addition, in the layer pattern 400 for the battery cell 105, the scaffold layer 310 can have at least one second side 405 (sometimes referred herein as an intermedial side) separate from the second side 225 of the complex structure 140. The scaffold layer 310 can form or correspond to at least a medial portion of the complex structure 140 within the layer pattern 400. The second side 405 can be distinct and physically distanced from the second side 225 of the complex structure 140. As such, the second side 405 of the scaffold layer 310 may not be in direct physical contact with the negative conductive layer 235. The second side 405 of the scaffold layer 310 may not directly interface with the negative conductive layer 235. The second side 405 of the scaffold layer 310 can be electrically coupled with the negative conductive layer 235 through another sub-layer of the complex structure 140. On the other hand, in the layer pattern 400, at least a portion of the first side 320 of the scaffold layer 310 can be in contact or flush with the second side 315 of the anti-dendrite functional layer 305. The first side 320 of the scaffold layer 310 can interface with the second side 315 of the anti-dendrite functional layer 305.

In the layer pattern 400 for the battery cell 105, the complex structure 140 can include at least one other anti-dendrite functional layer 410 (sometimes referred herein as a conductive layer-interfacing anti-dendrite functional layer). The anti-dendrite functional layer 410 can be disposed or arranged within the cavity 130 of the housing 110 of the battery cell 105 along the second side 405 of the carbon-matrix structure 310. The anti-dendrite functional layer 410 can be situated within the cavity 130 of the housing 110 between the second side 405 of the carbon-matrix structure 310 and the negative conductive layer 235. The anti-dendrite functional layer 410 can form or correspond to at least a portion of the complex structure 140 along the second side 225. At least one side of the anti-dendrite functional layer 410 can include or correspond to the second side 225 of the complex structure 140. The side of the anti-dendrite functional layer 410 corresponding to the second side 225 of the complex structure 140 can face one side of the negative conductive layer 235. At least a portion of the anti-dendrite functional layer 410 along the second side 225 can be in contact or flush with at least a portion of one side of the negative conductive layer 235. The anti-dendrite functional layer 410 can be mechanically coupled with the negative conductive layer 235 via the second side 225. The anti-dendrite functional layer 410 can interface with the negative conductive layer 235 through the second side 225. The anti-dendrite functional layer 410 can be electrically coupled with the negative conductive layer 235 via the second side 225.

In addition, the anti-dendrite functional layer 410 can have at least one first side 415 (sometimes referred herein as an intermedial side). The first side 415 can correspond to one surface (e.g., longitudinal or lateral) of the anti-dendrite functional layer 410. The first side 415 of the anti-dendrite functional layer 410 can be opposite of the second side 225 in contact with the negative conductive layer 235. At least a portion of the anti-dendrite functional layer 410 along the first side 415 can be in contact or flush with at least a portion of the second side 405 of the scaffold layer 310. The first side 415 of the anti-dendrite functional layer 410 can be mechanically coupled with the scaffold layer 310 through the second side 405. The first side 415 of the anti-dendrite functional layer 410 can interface with the scaffold layer 310 via the second side 405. The first side 415 of the anti-dendrite functional layer 410 can be mechanically coupled with the second side 405 of the scaffold layer 310 (e.g., intermeshing, bonding, or connecting). The anti-dendrite functional layer 410 can be electrically coupled with the scaffold layer 310 via the first side 405 of the scaffold layer 310. The anti-dendrite functional layer 410 can have a length (or height) ranging between 50 mm to 120 mm. The anti-dendrite functional layer 410 can have a width ranging between 50 mm to 120 mm. The anti-dendrite functional layer 410 can have a thickness ranging between 0.01 µm and 10 µm. The thickness of the anti-dendrite functional layer 410 can be the same or can differ from the thickness of the anti-dendrite functional layer 305. The thickness of the anti-dendrite functional layer 410 can correspond to a distance between the first side 415 and the second side 225. The thickness of the anti-dendrite functional layer 410 can be less than the thickness of the scaffold layer 310. A ratio between the thickness of the anti-dendrite functional layer 405 and the thickness of the scaffold layer 310 can range between 0 and 1000.

The anti-dendrite functional layer 410 can be comprised of a metallic, semiconductor, or non-metallic material, such as bismuth (Bi), tin (Sn), silicon (Si), silver (Au), gold (Ag), germanium (Ge), antimony (Se), selenium (Sb), lead (Pb), arsenic (As), phosphorous (P), sulfur (S), or platinum (Pt), or any combination thereof, among others. The density of the material of the anti-dendrite functional layer 410 can range between 0.1 g/cc to 30 g/cc. The anti-dendrite functional layer 410 can be comprised of an inorganic or organic substances. The anti-dendrite functional layer 410 can be initially free of any lithium material prior to the first charging cycle of the battery cell 105. The carbon-based composite material of the scaffold layer 310 can bond with the material of the anti-dendrite functional layer 410. For example, at least a portion of the material of the anti-dendrite functional layer 410 along the first side 415 can be intermeshed or intercalated with the carbon-based composite material of the scaffold layer 310 along the second side 405. As such, the boundary between the first side 415 of the anti-dendrite functional layer 305 and the second side 405 of the scaffold layer 310 can be a gradient.

During the charging of the battery cell 105, the anti-dendrite functional layer 410 can receive lithium material originating from the cathode layer 135 and traversing through the anti-dendrite functional layer 305 and the scaffold layer 310. The anti-dendrite functional layer 410 can bond or form an alloy with the received lithium material. The bonding of the lithium material with the anti-dendrite functional layer 410 can be independent of the inhomogeneity of the dispersal of the lithium material through the solid electrolyte layer 145. The alloy formed by the anti-dendrite functional layer 305 can include, for example, a binary alloy (e.g., lithium-bismuth (Li—Bi), lithium-tin (Li—Sn), or lithium-silicon (Li—Si)) a trinary alloy (e.g., lithium-bismuth-silicon (Li—Bi—Sn) or lithium-phosphorus-platinum (Li—P—Pt)), or quaternary alloy (e.g., lithium-silicon-germanium-antinomy (Li—Si—Ge—Se)), among any other combinations. By forming an alloy with the lithium material received from the solid electrolyte layer 145, the anti-dendrite functional layer 305 can prevent the dendritic growth of lithium into the solid electrolyte layer 145. In addition, because of the property of the anti-dendrite functional layer 305, the anti-dendrite functional layer 305 can accelerate the diffusion of lithium material transferred through the solid electrolyte layer 145.

During the charging of the battery cell 105, the lithium material received from the cathode layer 135 through the solid electrolyte layer 145 can bond with the anti-dendrite functional layer 305 or can traverse through the anti-dendrite functional layer 410. Due to the differences in materials, the interface adhesion between the first side 220 of the anti-dendrite functional layer 305 and the second side 205 of the electrolyte layer 145 can be stronger than the interface adhesion between the second side 225 of the anti-dendrite functional layer 410 and the side of the negative conductive layer 235. Since the interface adhesion between the anti-dendrite functional layer 305 and the electrolyte 145 is stronger, the probability of the lithium material attaching along the second side 205 can be lower. Instead, the probability of the lithium material attaching along the second side 225 of the anti-dendrite functional layer 410 can be higher. As such, rather than amassing on the first side 220 of the anti-dendrite functional layer 305, the lithium material can be guided through the scaffold layer 310 and the anti-dendrite functional layer 410 toward the negative conductive layer 235. The scaffold layer 310 and the anti-dendrite functional layer 410 can permit accumulation of the lithium material along the second side 225 during charging of the battery cell 105. As the lithium material is deposited further from the solid electrolyte layer 145, the likelihood of the growth of the lithium material penetrating into the solid electrolyte layer 145 can be reduced. Conversely, while discharging the battery cell 105, the lithium material can move away from the negative conductive layer 235 back toward the anti-dendrite functional layer 305. The scaffold layer 310 and the anti-dendrite functional layer 410 can permit dispersal or stripping of the lithium material accumulated along the second side 225 of the complex structure 140 during discharging of the battery cell 105. In this manner, plating of the lithium material received at the complex structure 140 can be restricted by the scaffold layer 310 and the anti-dendrite function layer 410 toward the second side 225.

Figure 5:
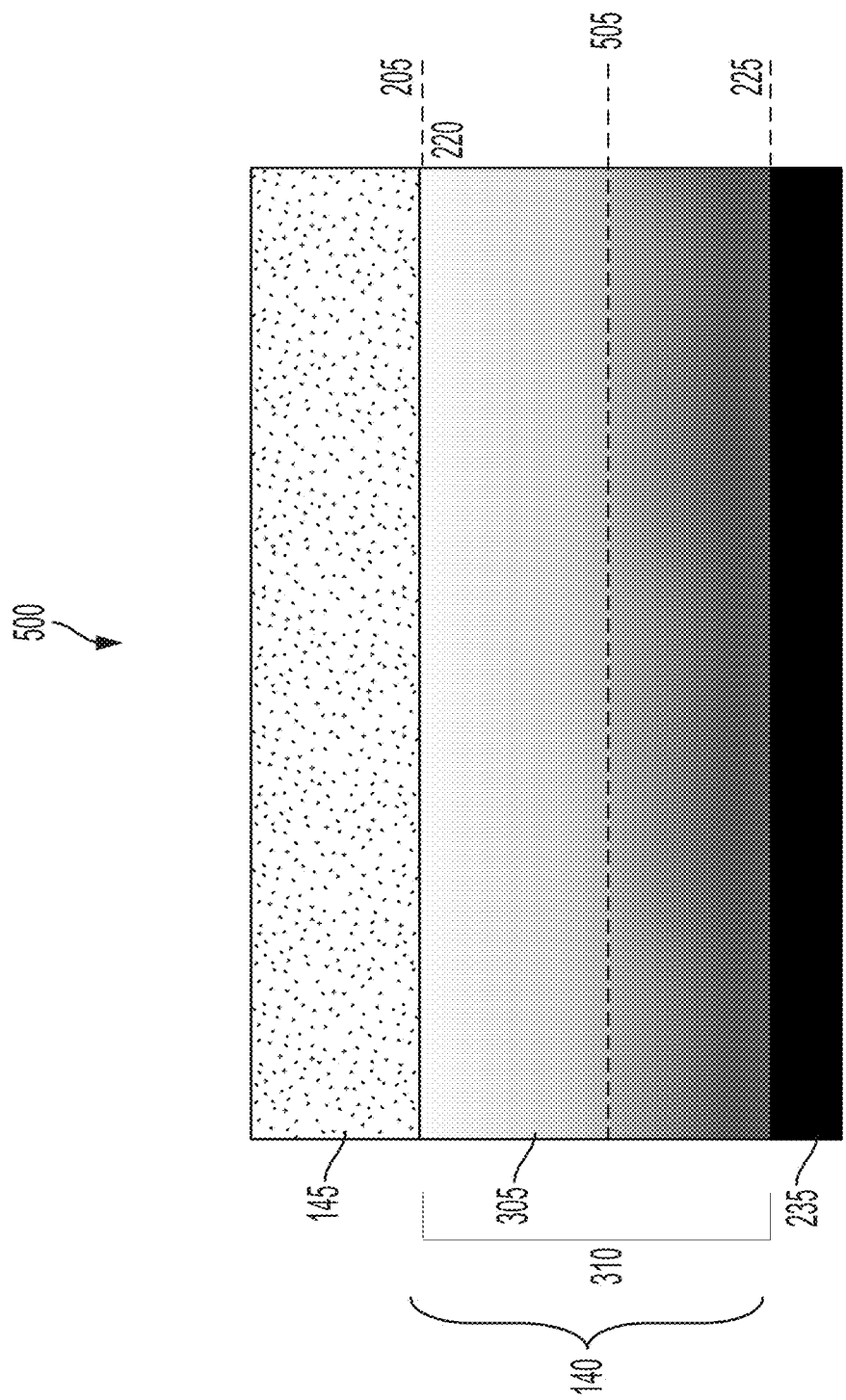
FIG. 5 is a cross-sectional view of an example layer pattern of a battery cell for powering electric vehicles.

FIG. 5, among others, depicts a cross-sectional view of a layer pattern 500 of the battery cell 105 for powering electric vehicles. In the layer pattern 500 for the battery cell 105, the complex structure 140 can include the scaffold layer 310 with the anti-dendrite functional layer 305 interspersed in the scaffold layer 310. The scaffold layer 310 can be disposed or arranged within the cavity 130 in the housing 110 of the battery cell 105 along the second side 205 of the solid electrolyte layer 145. The scaffold layer 310 can form or correspond to an entirety or a substantial entirety (e.g., greater than 85%) of the complex structure 140 in the layer pattern 500 of the battery cell 105. The scaffold layer 310 can at least partially span from the first side 220 to the second side 225 of the complex structure 140. The anti-dendrite functional layer 305 can partially span starting from the first side 220 toward the second side 225 of the complex structure 140 within the scaffold layer 310.

At least one side (e.g., longitudinal or lateral) of the scaffold layer 310 can include or correspond to the first side 220 of the complex structure 140. At least a portion of the scaffold layer 310 along the first side 220 can be in contact or flush with at least a portion of the second side 205 of the solid electrolyte layer 145. The scaffold layer 310 can be mechanically coupled with the solid electrolyte layer 145 through the first side 220. The scaffold layer 310 can interface with the solid electrolyte layer 145 via the first side 220. The scaffold layer 310 can be electrically coupled with the solid electrolyte layer 145 through the first side 220. At least one side (e.g., longitudinal or lateral) of the scaffold layer 310 can include or correspond to the second side 225 of the complex structure 140. At least a portion of the scaffold layer 310 along the second side 225 can be in contact or flush with at least a portion of one side of the negative conductive layer 235. The scaffold layer 310 can be mechanically coupled with the negative conductive layer 235 through the second side 225. The scaffold layer 310 can interface with the negative conductive layer 235 via the second side 225. The scaffold layer 310 can be electrically coupled with the negative conductive layer 235 through the second side 225. In the layer pattern 500, the scaffold layer 310 can have a length (or height) ranging between 50 mm to 120 mm. The scaffold layer 310 can have a width ranging between 50 mm to 2000 mm. The scaffold layer 310 can have a thickness ranging between 0.02 μm and 30 μm. The thickness of the scaffold layer 310 can correspond to a distance between the first side 220 and second side 225 of the complex structure 140.

The anti-dendrite functional layer 305 can be diffused, distributed, or interspersed within the scaffold layer 310. The anti-dendrite functional layer 305 can be comprised of a metallic, semiconductor, or non-metallic material, such as bismuth (Bi), tin (Sn), silicon (Si), silver (Au), gold (Ag), germanium (Ge), antimony (Se), selenium (Sb), lead (Pb), arsenic (As), phosphorous (P), sulfur (S), or platinum (Pt), or any combination thereof, among others. The anti-dendrite functional layer 305 can be comprised of an inorganic or organic substances. The materials of the anti-dendrite functional layer 305 can be infused, intermeshed, or interspersed within the organic or inorganic material of the scaffold layer 310. The density or concentration of the material of the anti-dendrite functional layer 305 can vary or differ within the scaffold layer 310, and can range between 0.1 g/cc to 30 g/cc.

The anti-dendrite functional layer 305 can form a gradient dispersion within the scaffold layer 310. The gradient dispersion of the material for the anti-dendrite functional layer 305 within the scaffold layer 310 can be linear (e.g., as depicted with the shading in FIG. 5). The density of the material of the anti-dendrite functional layer 305 along the first side 220 can be greater than the density of the material of the anti-dendrite functional layer 305 along the second side 225. For example, the density of the material for the anti-dendrite functional layer 305 can be the maximum along the first side 220 and can range between 25 g/cc to 30 g/cc. The density for the material of the anti-dendrite functional layer 305 can be minimum along the second side 225 and can range between 0.1 g/cc to 5 g/cc. Conversely, the density of the material of the anti-dendrite functional layer 305 along the first side 220 can be less than the density of the material of the anti-dendrite functional layer 305 along the second side 225. For example, the density of the material for the anti-dendrite functional layer 305 can be the maximum along the first side 220 and can range between 10 g/cc to 15 g/cc. The density for the material of the anti-dendrite functional layer 305 can be minimum along the second side 225 and can range between 25 g/cc to 30 g/cc. The gradient dispersion of the material for the anti-dendrite functional layer 305 within the scaffold layer 310 can be convex or concave. The density of the material of the anti-dendrite functional layer 305 along the first side 220 and the second side 225 can be greater than the density of the material of the anti-dendrite functional layer 305 generally along a midline 505 of the carbon-matrix structure 310. For example, the density of the material for the anti-dendrite functional layer 305 can range between 25 g/cc to 30 g/cc toward the first side 220, range between 20 g/cc to 25 g/cc toward the second side 225, and range between 0.1 g/cc to 5 g/cc along the midline 505.

During the operation of the battery cell 105, the anti-dendrite functional layer 305 and the scaffold layer 310 can receive the lithium material originating from the cathode layer 135 through the second side 205 of the solid electrolyte layer 145. The anti-dendrite functional layer 305 can bond or form an alloy with the lithium material received from the solid electrolyte layer 145. The bonding of the lithium material with the anti-dendrite functional layer 305 can be independent of the inhomogeneity of the dispersal of the lithium material through the solid electrolyte layer 145. The alloy formed by the anti-dendrite functional layer 305 can include, for example, a binary alloy (e.g., lithium-bismuth (Li—Bi), lithium-tin (Li—Sn), or lithium-silicon (Li—Si)), a trinary alloy (e.g., lithium-bismuth-silicon (Li—Bi—Sn) or lithium-phosphorus-platinum (Li—P—Pt)), or quaternary alloy (e.g., lithium-silicon-germanium-antinomy (Li—Si—Ge—Se)), among any other combinations. By forming an alloy with the lithium material received from the solid electrolyte layer 145, the anti-dendrite functional layer 305 can prevent the dendritic growth of lithium into the solid electrolyte layer 145. In addition, because of the property of the anti-dendrite functional layer 305, the anti-dendrite functional layer 305 can accelerate the diffusion of lithium material transferred through the solid electrolyte layer 145.

The accumulation of lithium material can be maintained by the anti-dendrite functional layer 305 within the scaffold layer 310. In addition, because of the property of the anti-dendrite functional layer 305, the anti-dendrite functional layer 305 can accelerate the diffusion of lithium material transferred through the solid electrolyte layer 145. Furthermore, interspersed within the scaffold layer 310, the alloy formed between the material of the anti-dendrite functional layer 305 and the received lithium material can reside within the scaffold layer 310. The density of the alloy formed between the material of the anti-dendrite functional layer 305 and the received lithium material can depend on the density of the anti-dendrite functional layer 305 within the scaffold layer 310.

Furthermore, due to the differences in materials, the interface adhesion between the first side 220 and the second side 205 of the electrolyte layer 145 can be stronger than the interface adhesion between the second side 225 and the side of the negative conductive layer 235. Since the interface adhesion between the anti-dendrite functional layer 305 and the electrolyte 145 is stronger, the probability of the lithium material attaching along the second side 205 can be lower. Instead, the probability of the lithium material attaching along the second side 225 of the scaffold layer 310 can be higher. As such, rather than amassing on the first side 220, the lithium material can be guided through the scaffold layer 310 toward the negative conductive layer 235. The scaffold layer 310 can permit accumulation of the lithium material along the second side 225 during charging of the battery cell 105. As the lithium material is deposited further from the solid electrolyte layer 145, the likelihood of the growth of the lithium material penetrating into the solid electrolyte layer 145 can be reduced. Conversely, while discharging the battery cell 105, the lithium material can move away from the negative conductive layer 235 through the electrolyte layer 145. The scaffold layer 310 can permit dispersal or stripping of the lithium material accumulated along the second side 225 during discharging of the battery cell 105. In this manner, plating of the lithium material received at the complex structure 140 can be restricted by the carbon matrix structure 300 toward the second side 225.

Figure 6:
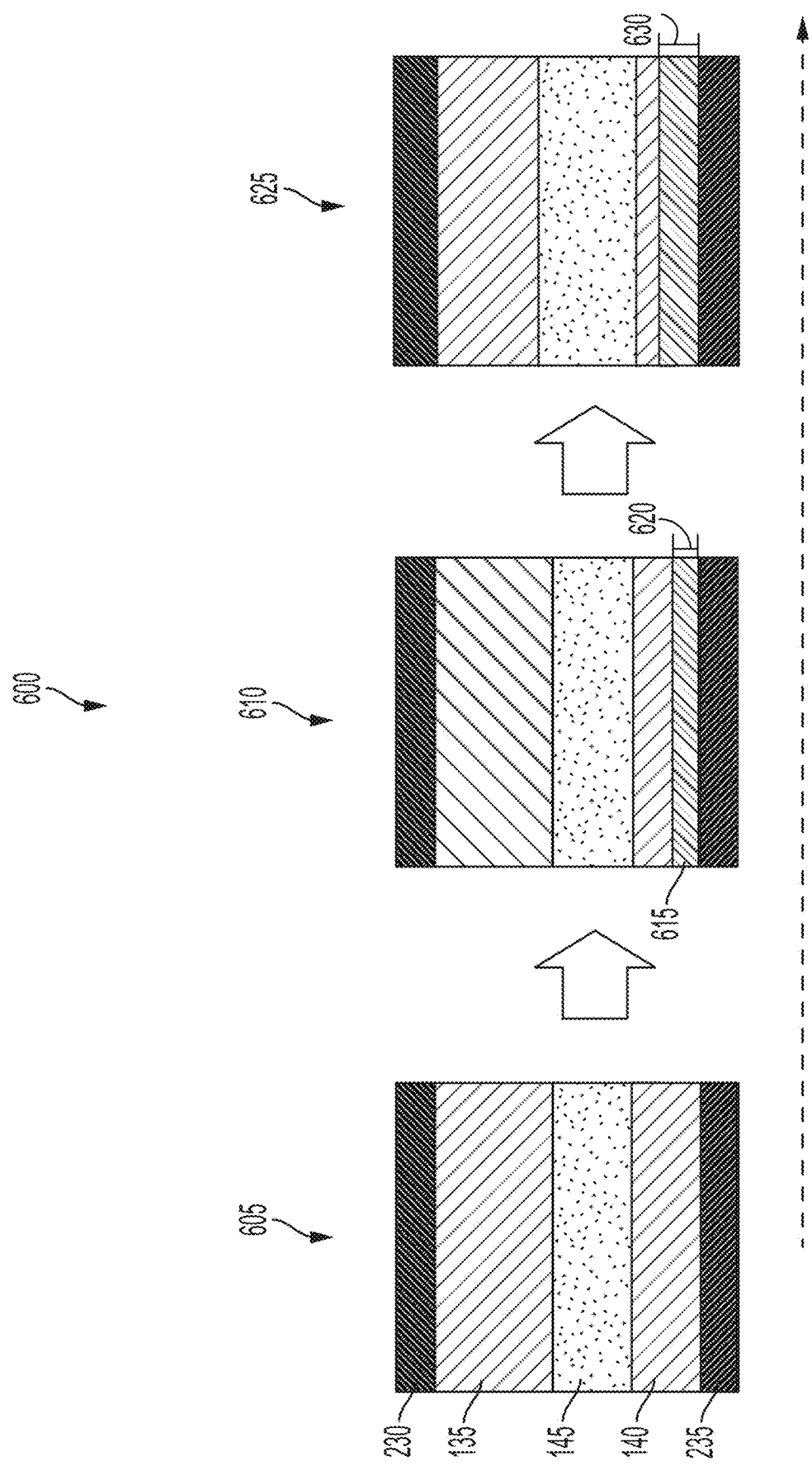
FIG. 6 is a cross-sectional view of an example battery cell for powering electric vehicles during a charging cycle.

FIG. 6, among others, depicts a cross-sectional view of the battery cell 105 for powering electric vehicles during a charging cycle 600. Prior to charging of the battery cell 105, the complex structure 140 can initially lack any accumulation or deposition of lithium material (605). Instead, the lithium material in the battery cell 105 can reside in the cathode layer 135 or the solid electrolyte layer 145. As the battery cell 105 is charged, the lithium material can accumulate as a plate 615 within the complex structure 140 along the negative conductive layer 235 (610). Since the anti-dendrite functional layer 305 is arranged along the solid electrolyte layer 145, the lithium material received through the solid electrolyte layer 145 can be guided through the scaffold layer 310 toward the negative conductive layer 235. Upon arrival toward the negative conductive layer 235, the scaffold layer 310 can accumulate the lithium material to undergo lithium plating 615 the interface between the scaffold layer 310 and the negative conductive layer 235. The lithium plating 615 can have a thickness 620 ranging between 0.01 µm to 100 µm. With further charging of the battery cell 105, more and more lithium material can be accumulated in the scaffold layer 310 along the interface with the negative conductive layer 235 (625). With more and more lithium received through the solid electrolyte layer 145, the lithium plating 615 can have a thickness 630 greater than the thickness 620. The thickness 630 of the lithium plating 615 can range between 0.01 µm to 100 µm. Any additional accumulated lithium material can bond or form an alloy with the anti-dendrite functional layer 305 of the complex structure 140, thereby preventing dendritic growth of lithium into the solid electrolyte layer 145.

Figure 7:
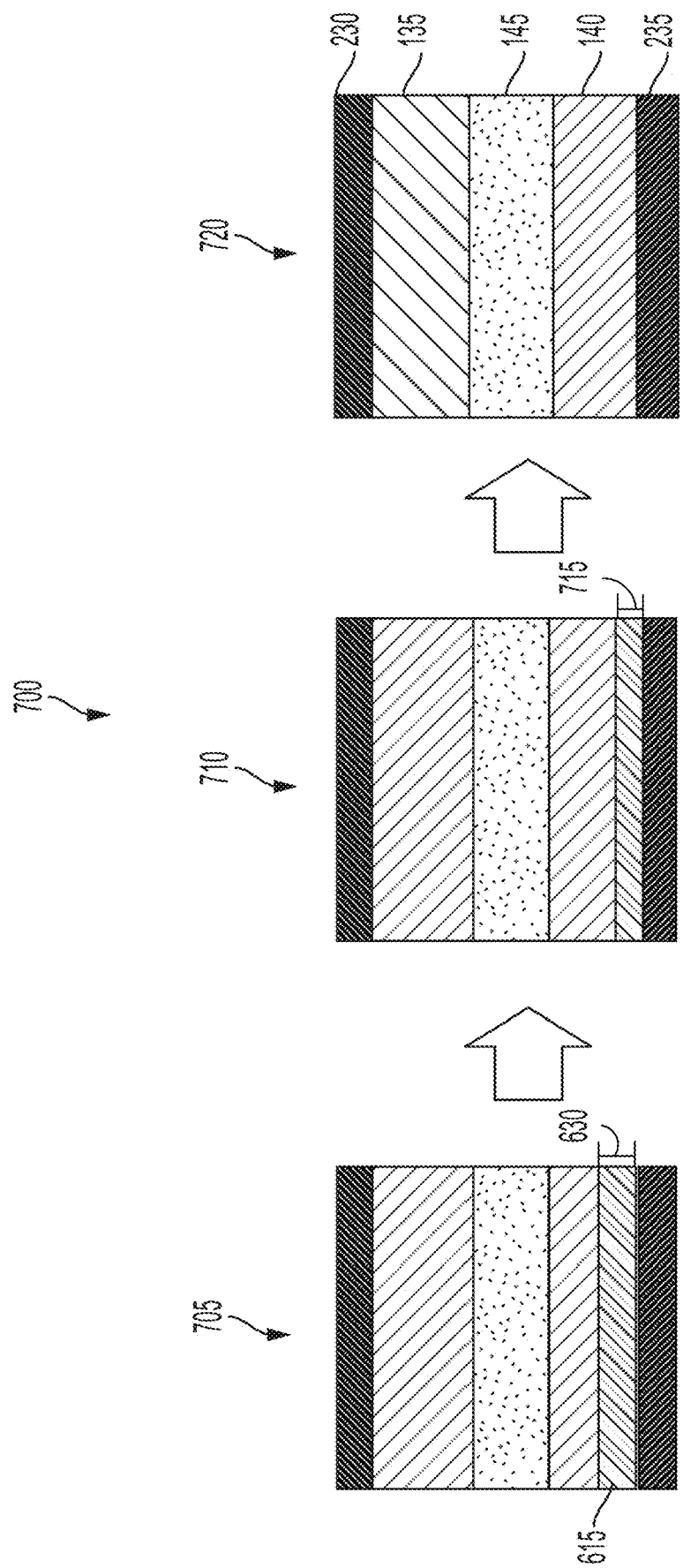
FIG. 7 is a cross-sectional view of an example battery cell for powering electric vehicles during a discharging cycle.

FIG. 7, among others, depicts a cross-sectional view of the battery cell 105 with the layer pattern 300 for powering electric vehicles during a discharging cycle 700. Subsequent to the charging cycle 600, the complex structure 140 can have lithium plating 615 in the scaffold layer 310 along the interface with the negative conductive layer 325 (705). The lithium plating 615 can have the thickness 630. The plating of the lithium material can be reversed with discharging. As the battery cell 105 is discharged, the lithium material can move from the passive layer 145 back to the solid electrolyte layer 145 and the cathode layer 135 (710). As a result, the lithium plating 615 can have a thickness 715 that can be less than the thickness 630 subsequent to charging. The thickness 715 of the lithium plating 615 can range between 0.01 µm to 100 µm. With further discharging of the battery cell 105, more and more lithium material can move back toward the solid electrolyte layer 145 and the cathode layer 145, and the lithium plating 615 can be eventually stripped (720).

With repeated use of the battery cell 105 (e.g., charging cycle 600 and discharging cycle 700), the transferal of the lithium material can be unevenly distributed. This can result in clumping of lithium in one region and absence of lithium in another region along the interface. Without the anti-dendrite functional layer 305 in the complex structure 140, the battery cell 105 can suffer from lithium dendritic growth that can eventually pierce the solid electrolyte layer 145 resulting in a short circuit. With the anti-dendrite functional layer 305 disposed along the solid electrolyte layer 145, however, the dendritic growth of the lithium material into the solid electrolyte layer 145 can be prevented. As the lithium material travels back toward the solid electrolyte layer 145 and the cathode layer 135, the lithium material can become bonded and can form an alloy with the anti-dendrite functional layer 305.

Figure 8:
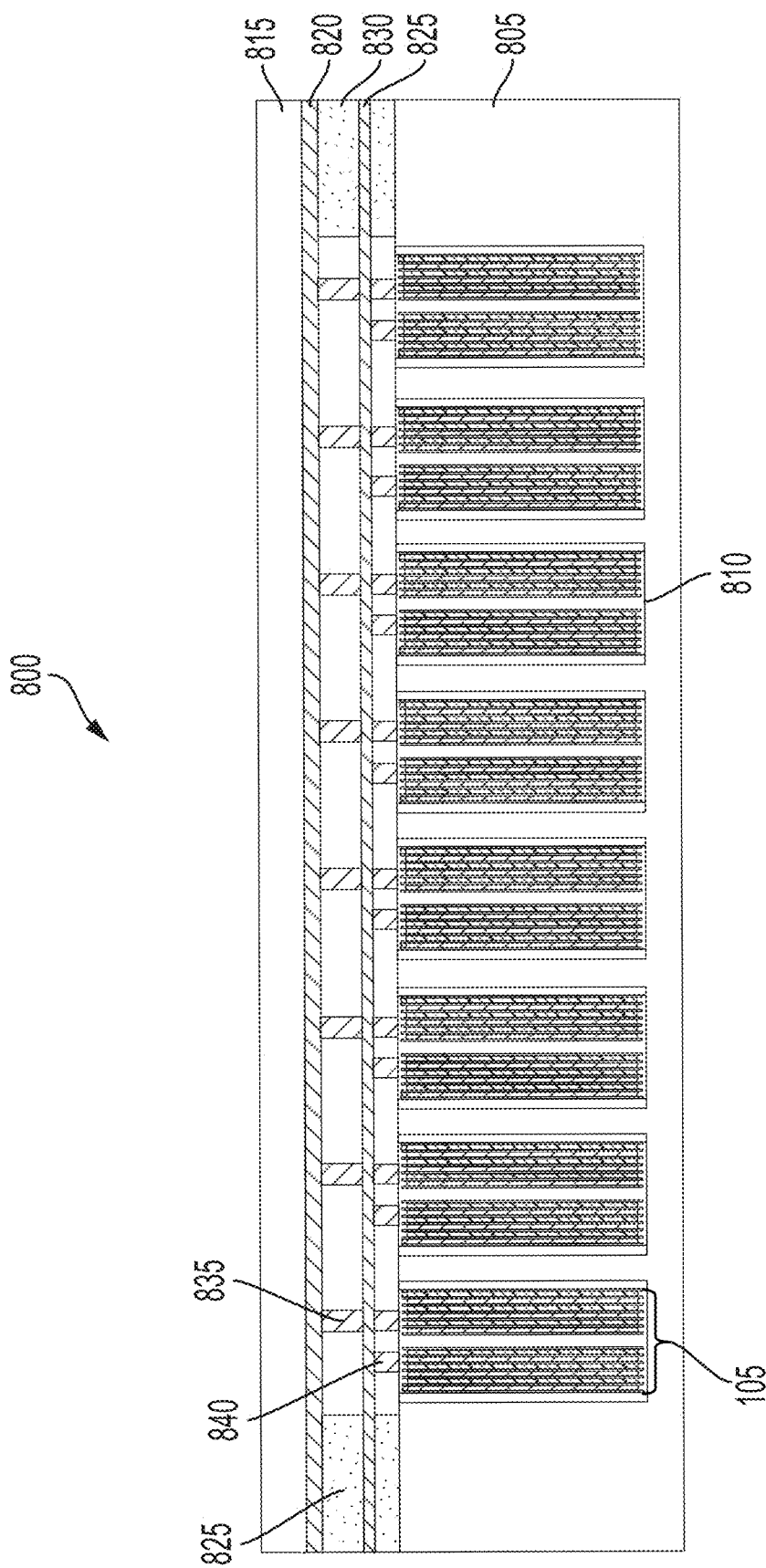
FIG. 8 is a block diagram depicting a cross-sectional view of an example battery module for holding battery cells in an electric vehicle.

FIG. 8, among others, depicts a cross-section view of a battery module 800 to hold a set of battery cells 105 in an electric vehicle. The battery module 800 can be part of the system or apparatus 100. The battery module 800 can be of any shape. The shape of the battery module 800 can be cylindrical with a circular, elliptical, or ovular base, among others. The shape of the battery module 800 can also be prismatic with a polygonal base, such as a triangle, a square, a rectangle (e.g., as depicted), a pentagon, and a hexagon, among others. The battery module 800 can have a length ranging between 10 cm to 200 cm. The battery module 800 can have a width ranging between 10 cm to 200 cm. The battery module 800 can have a height ranging between 65 mm to 100 cm.

The battery module 800 can include at least one battery case 805 and a capping element 815. The battery case 805 can be separated from the capping element 815. The battery case 805 can include or define a set of holders 810. Each holder 810 can be or include a hollowing or a hollow portion defined by the battery case 805. Each holder 810 can house, contain, store, or hold a battery cell 105. The battery case 805 can include at least one electrically or thermally conductive material, or combinations thereof. Between the battery case 805 and the capping element 815, the battery module 800 can include at least one positive current collector 820, at least one negative current collector 825, and at least one electrically insulative layer 830. The positive current collector 820 and the negative current collector 825 can each include an electrically conductive material to provide electrical power to other electrical components in the electric vehicle. The positive current collector 820 (sometimes referred herein as a positive busbar) can be connected or otherwise electrically coupled with the positive conductive layer 230 of each battery cell 105 housed in the set of holders 810 via a bonding element 835. One end of the bonding element 835 can be bonded, welded, connected, attached, or otherwise electrically coupled to the positive conductive layer 230 of the battery cell 105. The negative current collector 825 (sometimes referred herein as a negative busbar) can be connected or otherwise electrically coupled with the negative conductive layer 235 of each battery cell 105 housed in the set of holders 810 via a bonding element 840. The bonding element 840 can be bonded, welded, connected, attached, or otherwise electrically coupled to the negative conductive layer 235 of the battery cell 105.

The positive current collector 820 and the negative current collector 825 can be separated from each other by the electrically insulative layer 830. The electrically insulative layer 830 can include spacing to pass or fit the positive bonding element 835 connected to the positive current collector 820 and the negative bonding element 825 connected to the negative current collector 825. The electrically insulative layer 830 can partially or fully span the volume defined by the battery case 805 and the capping element 815. A top plane of the electrically insulative layer 830 can be in contact or be flush with a bottom plane of the capping element 815. A bottom plane of the electrically insulative layer 830 can be in contact or be flush with a top plane of the battery case 805. The electrically insulative layer 830 can include any electrically insulative material or dielectric material, such as air, nitrogen, sulfur hexafluoride ($SF_6$), ceramic, glass, and plastic (e.g., polysiloxane), among others to separate the positive current collector 820 from the negative current collector 825.

Figure 9:
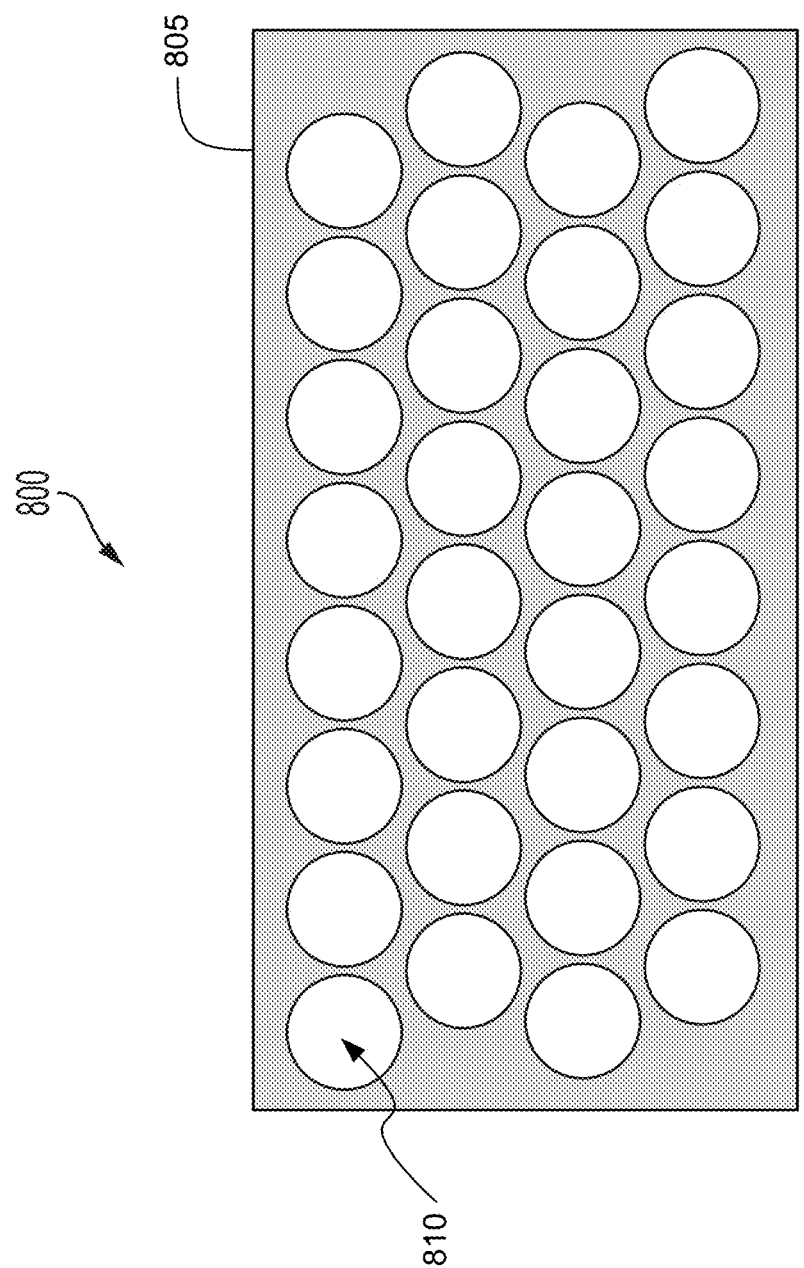
FIG. 9 is a block diagram depicting a top-down view of an example battery pack for holding for battery cells in an electric vehicle.

FIG. 9, among others, depicts a top-down view of a battery module 800 to a hold a plurality of battery cells 105 in an electric vehicle. The battery module 800 can define or include a set of holders 810. The shape of each holder 810 can match a shape of the housing 105 of the battery cell 105. The shape of each holder 810 can be cylindrical with a circular (e.g., as depicted), elliptical, or ovular base, among others. The shape of each holder 810 can also be prismatic with a polygonal base, such as a triangle, a square, a rectangle, a pentagon, and a hexagon, among others. The shapes of each holder 810 can vary or can be uniform throughout the battery module 800. For example, some holders 810 can be hexagonal in shape, whereas other holders can be circular in shape. The dimensions of each holder 810 can be larger than the dimensions of the battery cell 105 housed therein. Each holder 810 can have a length ranging between 10 mm to 300 mm. Each holder 810 can have a width ranging between 10 mm to 300 mm. Each holder 810 can have a height (or depth) ranging between 65 mm to 100 cm.

Figure 10:
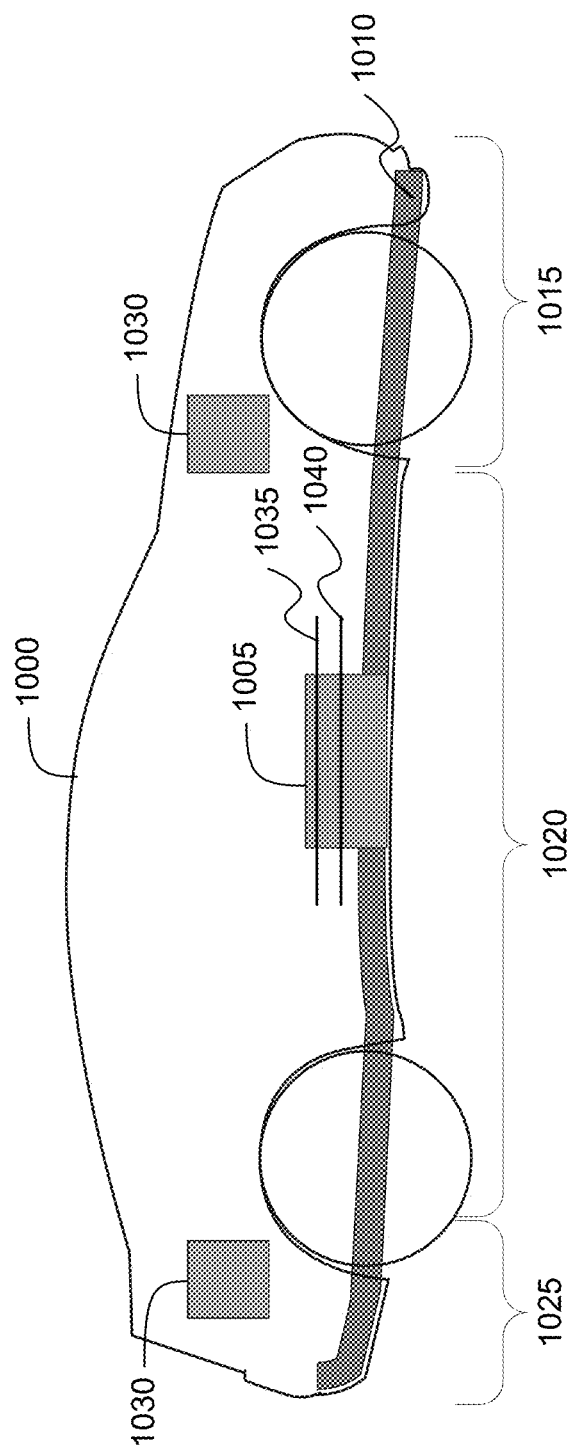
FIG. 10 is a block diagram depicting a cross-sectional view of an example electric vehicle installed with a battery pack.

FIG. 10, among others, depicts a cross-section view of an electric vehicle 1000 installed with a battery pack 1005. The apparatus to power the electric vehicle 1000 can include at least one battery cell 105, at least one battery module 800, and at least one battery pack 1005, including the components thereof. The battery pack 1005 can include one or more than one battery modules, for example. The electric vehicle 1000 can be an electric automobile (e.g., as depicted), hybrid, a motorcycle, a scooter, a passenger vehicle, a passenger or commercial truck, and another type of vehicle such as sea or air transport vehicles, a plane, a helicopter, a submarine, a boat, or a drone, among others. The electric vehicle 1000 can include at least one battery pack 1005. The battery pack 1005 can be part of the system or apparatus 100. The battery pack 1005 can house, contain, or otherwise include a set of battery modules 800. The battery pack 1005 can be of any shape. The shape of battery pack 1005 can be cylindrical with a circular, elliptical, or ovular base, among others. The shape of battery pack 1005 can also be prismatic with a polygonal base, such as a triangle, a square, a rectangle (e.g., as depicted), a pentagon, and a hexagon, among others. The battery pack 905 can have a length ranging between 100 cm to 600 cm. The battery pack 905 can have a width ranging between 50 cm to 400 cm. The battery pack 905 can have a height ranging between 70 mm to 1000 mm.

The electric vehicle 1000 can include at least one chassis 1010 (e.g., a frame, internal frame, or support structure). The chassis 1010 can support various components of the electric vehicle 1000. The chassis 1010 can span a front portion 1015 (e.g., a hood or bonnet portion), a body portion 1020, and a rear portion 1025 (e.g., a trunk portion) of the electric vehicle 1000. The battery pack 1005 can be installed or placed within the electric vehicle 1000. The battery pack 1005 can be installed on the chassis 1010 of the electric vehicle 1000 within the front portion 1015, the body portion 1020 (as depicted in FIG. 10), or the rear portion 1025.

The electric vehicle 1000 can include one or more components 1030. The one or more components 1030 can include an electric engine, an entertainment system (e.g., a radio, display screen, and sound system), on-board diagnostics system, and electric control units (ECUs) (e.g., an engine control module, a transmission control module, a brake control module, and a body control module), among others. The one or more components 1030 can be installed in the front portion 1015, the body portion 1020, or the rear portion 1025 of the electric vehicle 100. The battery pack 1005 installed in the electric vehicle 1000 can provide electrical power to the one or more components 1030 via at least one positive current collector 1035 and at least one negative current collector 1040. The positive current collector 1035 and the negative current collector 1040 can be connected or otherwise be electrically coupled to other electrical components of the electric vehicle 1000 to provide electrical power. The positive current collector 1035 (e.g., a positive busbar) can be connected or otherwise electrically coupled with each positive current collector 1035 of each battery module 800 in the battery pack 1005. The negative current collector 1040 (e.g., a negative busbar) can be connected or otherwise electrically coupled with each negative current collector 825 of each battery module 800 in the battery pack 1005.

Figure 11:
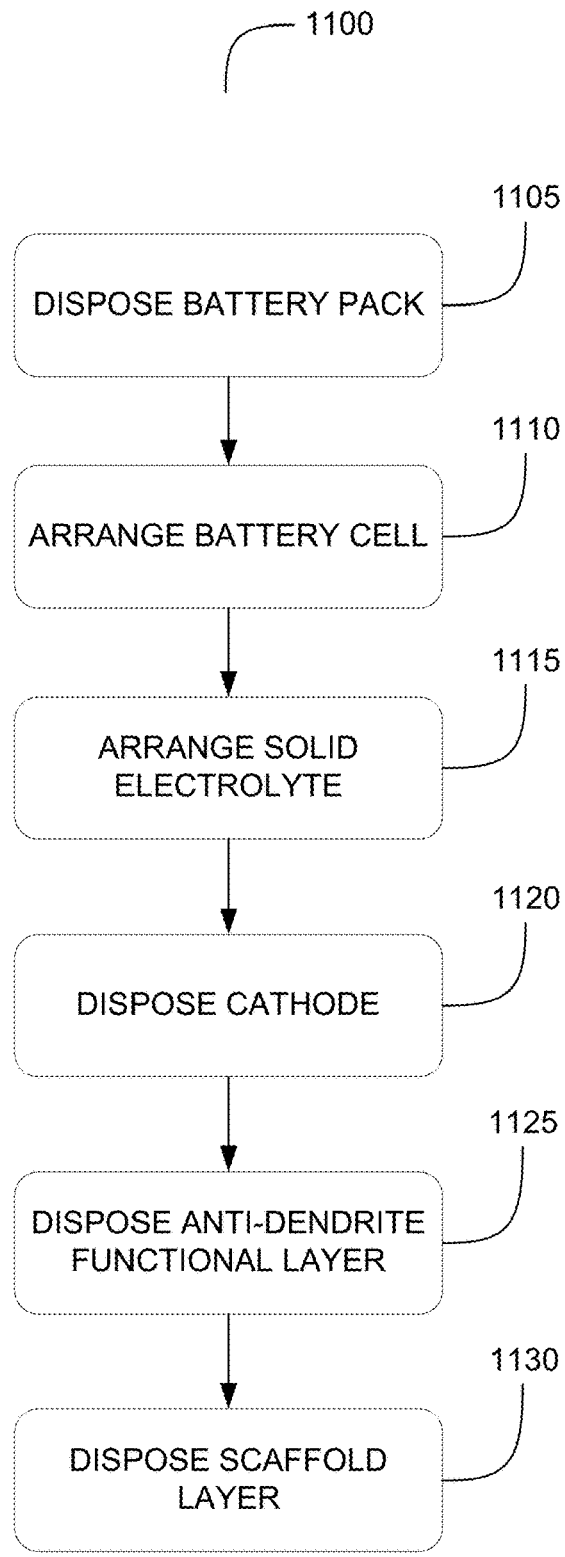
FIG. 11 is a flow diagram depicting an example method of assembling battery cells for battery packs for electric vehicles.

FIG. 11, among others, depicts a method 1100 of assembling battery cells to power electric vehicles. The functionalities of the method 1100 can be implemented or performed using any of the systems, apparatuses, or battery cells detailed above in conjunction with FIGS. 1-10. The method 1000 can include disposing a battery pack 1005 (ACT 1105). The battery pack 905 can be installed, arranged, or otherwise disposed in an electric vehicle 1000. The battery pack 905 can house, contain, or include a set of battery modules 700. The battery pack 905 can store electrical power for one or more components 1030 of the electric vehicle 1000. The battery pack 1005 can provide electrical power to the one or more components 1030 via a positive current collector 1035 and a negative current collector 1040.

The method 1100 can include arranging a battery cell 105 (ACT 1110). The battery cell 105 can be a lithium-ion battery cell. The battery cell 105 can be stored or contained within a holder 820 of the battery module 800 included in the battery pack 1005. The battery cell 105 can include a housing 110. The housing 110 can be formed from a cylindrical casing with a circular, ovular, or elliptical base or from a prismatic casing with a polygonal base. The housing 110 can include a top surface 115, a bottom surface 120, and a sidewall 125. The housing 110 can have a cavity 130 to contain contents of the battery cell 105. The cavity 130 within the housing 110 can be defined by the top surface 115, the bottom surface 120, and the sidewall 125.

The method 1100 can include arranging a solid electrolyte layer 145 (ACT 1115). The solid electrolyte layer 145 can be comprised of a solid or liquid electrolyte material. The material for the solid electrolyte layer 145 can be formed using deposition techniques, such as chemical deposition (e.g., chemical vapor deposition (CVD) or atomic layer deposition (ALD)) or physical deposition (e.g., molecular beam epitaxy (MBE) or physical vapor deposition (PVD)). For liquid electrolytes, the material for the solid electrolyte layer 145 can be doused or dissolved in an organic solvent. The solid electrolyte layer 145 can be fed, inserted, or otherwise placed into the cavity 130 of the housing 110 for the battery cell 105. The solid electrolyte layer 145 can at least partially span between the top surface 115, the bottom surface 120, and the sidewall 125 of the housing 110 for the battery cell 105.

The method 1100 can include disposing a cathode layer 135 (ACT 1120). The cathode layer 135 can be formed using deposition techniques, such as chemical deposition (e.g., chemical vapor deposition (CVD) or atomic layer deposition (ALD)) or physical deposition (e.g., molecular beam epitaxy (MBE) or physical vapor deposition (PVD)). The cathode layer 135 can be comprised of solid cathode materials, such as lithium-based oxide materials or phosphates. The cathode layer 135 can be placed or inserted into the cavity 130 of the housing 110 for the battery cell 105. The cathode layer 135 can be situated at least partially along the first side 200 of the solid electrolyte layer 145. The cathode layer 135 can output conventional electrical current into the battery cell 100. The cathode layer 135 can be electrically coupled with the positive conductive layer 230 also inserted into the cavity 130 in the housing 110 of the battery cell 105.

The method 1100 can include disposing an anti-dendrite functional layer 305 (ACT 1125). The anti-dendrite functional layer 305 can be formed using slurry coating processing techniques mixed with metal precursor, solvent (e.g., inorganic or organic), or carbon materials, among others.

The anti-dendrite functional layer 305 can be formed using also deposition techniques, such as chemical deposition (e.g., chemical vapor deposition (CVD) or atomic layer deposition (ALD)) or physical deposition (e.g., molecular beam epitaxy (MBE) or physical vapor deposition (PVD)). The anti-dendrite functional layer 305 can be formed using molding, casting, and smelting the one or more materials for the anti-dendrite functional layer 305, such as such as bismuth (Bi), tin (Sn), silicon (Si), silver (Au), gold (Ag), germanium (Ge), antimony (Se), selenium (Sb), lead (Pb), arsenic (As), phosphorous (P), sulfur (S), and platinum (Pt), among others. The anti-dendrite functional layer 305 can be formed using electroplating techniques. The anti-dendrite functional layer 305 can be placed or inserted into the cavity 130 of the housing 110 for the battery cell 105 as part of the complex structure 140. The anti-dendrite functional layer 305 can be situated at least partially along the second side 205 of the solid electrolyte layer 145. The anti-dendrite functional layer 305 can be electrically coupled with the negative conductive layer 235 also inserted into the cavity 130 in the housing 110 of the battery cell 105 via another component.

The method 1100 can include disposing a scaffold layer 310 (ACT 1130). The anti-dendrite functional layer 305 can be formed using slurry coating processing techniques mixed with precursor material, solvent (e.g., inorganic or organic), or carbon materials, among others. The scaffold layer 310 can be formed using deposition techniques, such as chemical deposition (e.g., chemical vapor deposition (CVD) or atomic layer deposition (ALD)) or physical deposition (e.g., molecular beam epitaxy (MBE) or physical vapor deposition (PVD)). The scaffold layer 310 can be comprised of a carbon-based composite material. The scaffold layer 310 can be placed or inserted into the cavity 130 of the housing 110 for the battery cell 105 as part of the complex structure 140. The scaffold layer 310 can be situated at least partially along the second side 315 of the anti-dendrite functional layer 305. The scaffold layer 310 can be electrically coupled with the negative conductive layer 235 also inserted into the cavity 130 in the housing 110 of the battery cell 105.

Figure 12:
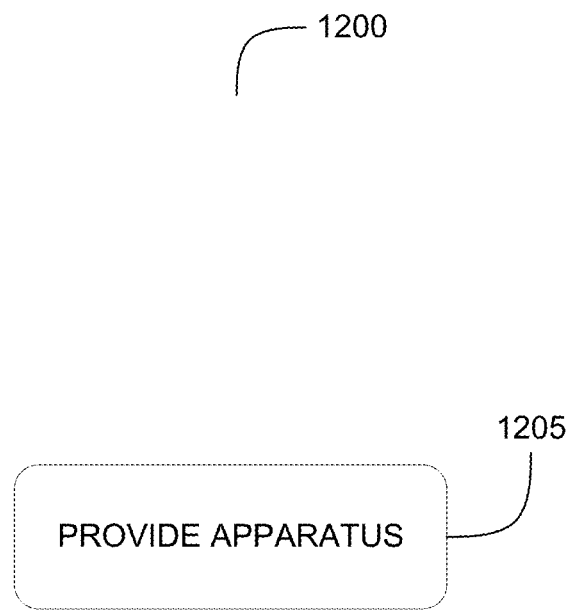
FIG. 12 is a flow diagram depicting an example of method of providing battery cells for battery packs for electric vehicles.

FIG. 12, among others, depicts a method 1200 of providing battery cells to power electric vehicles. The functionalities of the method 1200 can be implemented or performed using any of the systems, apparatuses, or battery cells detailed above in conjunction with FIGS. 1-10. The method 1100 can include providing an apparatus 100 (ACT 1205). The apparatus 100 can be installed in an electric vehicle 1000. The apparatus 100 can include a battery pack 1005 disposed in the electric vehicle 1000 to power one or more components 930 of the electric vehicle 1000. The battery pack 1005 can include one or more battery modules 800. The apparatus 100 can include a set of battery cells 105. Each battery cell 105 can be arranged in the battery module 800. The battery cell 105 can include a housing 110. The housing 110 can include a top surface 115, a bottom surface 120, and a sidewall 125. The top surface 115, the bottom surface 120, and the sidewall 125 can define a cavity 130.

Within the cavity 130 defined by the housing 110, the battery cell 105 can have a solid electrolyte layer 145. The solid electrolyte layer 145 can have a first side 200 and a second side 205, and can transfer ions between the first side 200 and the second side 205. The battery cell 105 can have a cathode layer 135 disposed within the cavity 130 of the housing 110 along the first side 200 of the solid electrolyte layer 145. The cathode layer 135 can be electrically coupled with the positive terminal of the battery cell via a positive conductive layer 230. The battery cell 105 can have an anti-dendrite functional layer 305 disposed within the cavity 130 of the housing 110 along the second side 205. The anti-dendrite functional layer 305 can be part of a complex structure 140 disposed in the cavity 130 along the second side 205 in the housing 110. The anti-dendrite functional layer 305 can have a first side 220 and a second side 315. The anti-dendrite functional layer 305 can be in contact with the second side 205 of the solid electrolyte layer 145 through the first side 220. The anti-dendrite functional layer 305 can form an alloy with the lithium material received via the solid electrolyte layer 145. The battery cell 105 can have a scaffold layer 310 disposed within the cavity 130 of the housing 110 along the second side 315 of the anti-dendrite functional layer 305. The scaffold layer 310 can be electrically coupled with the negative terminal for the battery cell 105 via the negative conductive layer 235.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

References to "or" can be construed as inclusive so that any terms described using "or" can indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Systems and methods described herein may be embodied in other specific forms without departing from the characteristics thereof. For example, descriptions of positive and negative electrical characteristics may be reversed. For example, elements described as negative elements can instead be configured as positive elements and elements described as positive elements can instead by configured as negative elements. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A battery cell, comprising:
   a housing defining a cavity;
   a solid electrolyte having a first side and a second side to transfer ions between the first side and the second side, the solid electrolyte arranged within the cavity;
   a cathode disposed within the cavity along the first side of the solid electrolyte, the cathode electrically coupled with a positive terminal;
   an anti-dendrite functional layer disposed within the cavity along the second side of the solid electrolyte, the anti-dendrite functional layer having a first side and a second side, the first side of the anti-dendrite functional layer in contact with the second side of the solid electrolyte, wherein:

the anti-dendrite functional layer forms to form an alloy with lithium material received from the cathode through the solid electrolyte during operation; and
a scaffold layer disposed within the cavity along the second side of the anti-dendrite functional layer, the scaffold layer electrically coupled with and directly contacting a negative terminal, wherein:
the scaffold layer comprises a carbon-based composite material and a binding agent; and
the scaffold layer bonds with the anti-dendrite functional layer by a material of the anti-dendrite functional layer being intercalated with the carbon-based composite material of the scaffold layer.

2. The battery cell of claim 1, comprising:
the scaffold layer having a first side and a second side, the first side of the scaffold layer in contact with the second side of the anti-dendrite functional layer to receive the lithium material via the solid electrolyte; and
a second anti-dendrite functional layer disposed within the cavity along the second side of the scaffold layer to prevent dendritic growth of the lithium material from the second side of the scaffold layer.

3. The battery cell of claim 1, comprising:
a positive conductive layer electrically coupled with the positive terminal; and
the cathode having a first side and a second side, the first side of the cathode in contact with the solid electrolyte, the second side of the cathode in contact with the positive conductive layer.

4. The battery cell of claim 1, comprising:
a negative conductive layer electrically coupled with the negative terminal; and
the scaffold layer having a first side and a second side, the first side of the scaffold layer in contact with the second side of the anti-dendrite functional layer to receive the lithium material via the solid electrolyte, the second side of the scaffold layer electrically coupled with the negative terminal via the negative conductive layer.

5. The battery cell of claim 1, comprising:
the anti-dendrite functional layer bonded to the solid electrolyte along the second side of the solid electrolyte via the alloy formed with the lithium material to receive the lithium material via the solid electrolyte.

6. The battery cell of claim 1, wherein:
the scaffold layer has a first side and a second side;
the first side of the scaffold layer contacts the second side of the anti-dendrite functional layer and receives the lithium material via the solid electrolyte; and
the second side of the scaffold layer permits lithium plating concurrent with charging of the battery cell and lithium stripping concurrent with discharging of the battery cell.

7. The battery cell of claim 1, comprising:
the scaffold layer including a gradient dispersion of at least a portion of the anti-dendrite functional layer.

8. The battery cell of claim 1, comprising:
the anti-dendrite functional layer and the scaffold layer both free of the lithium material prior to an initial charge cycle of the battery cell.

9. The battery cell of claim 1, comprising:
the anti-dendrite functional layer comprising at least one of bismuth, tin, gold, silver, germanium, antimony, selenium, lead, arsenic, phosphorus, sulfur, and platinum.

10. The battery cell of claim 1, comprising:
the anti-dendrite functional layer having a thickness ranging from 0.01 μm to 10 μm, the thickness of the anti-dendrite functional layer less than a thickness of the scaffold layer.

11. The battery cell of claim 1, comprising:
the scaffold layer having a thickness ranging from 1 μm to 30 μm, the thickness of the scaffold layer greater than a thickness of the anti-dendrite functional layer.

12. The battery cell of claim 1, wherein the battery cell is installed in an electric vehicle to power the electric vehicle.

13. A method of producing battery cells, the method comprising:
arranging, within a cavity of a battery cell, a solid electrolyte having a first side and a second side to transfer ions between the first side and the second side;
disposing, within the cavity along the first side of the solid electrolyte, a cathode;
disposing, within the cavity along the second side of the solid electrolyte, an anti-dendrite functional layer having a first side and a second side, the first side of the anti-dendrite functional layer in contact with the second side of the solid electrolyte, wherein:
the anti-dendrite functional layer forms an alloy with lithium material received from the cathode through the solid electrolyte during operation; and
disposing, within the cavity along the second side of the anti-dendrite functional layer, a scaffold layer electrically coupled with and directly contacting a negative terminal, wherein:
the scaffold layer comprises a carbon-based composite material and a binding agent; and
the scaffold layer bonds with the anti-dendrite functional layer by a material of the anti-dendrite functional layer being intercalated with the carbon-based composite material of the scaffold layer.

14. The method of claim 13, comprising:
disposing the scaffold layer having a first side and a second side, the first side of the scaffold layer in contact with the second side of the anti-dendrite functional layer to receive the lithium material via the solid electrolyte; and
disposing, within the cavity along the second side of the scaffold layer, a second anti-dendrite functional layer to prevent dendritic growth of the lithium material from the second side of the scaffold layer.

15. The method of claim 13, comprising:
disposing, within the cavity, a positive conductive layer electrically coupled with a positive terminal; and
disposing the cathode having a first side and a second side, the first side of the cathode in contact with the solid electrolyte, the second side of the cathode electrically in contact with the positive conductive layer.

16. The method of claim 13, comprising:
disposing, within the cavity, a negative conductive layer electrically coupled with the negative terminal; and
disposing the scaffold layer having a first side and a second side, the first side of the scaffold layer in contact with the second side of the anti-dendrite functional layer to receive the lithium material via the solid electrolyte, the second side of the scaffold layer electrically coupled with the negative terminal via the negative conductive layer.

17. The method of claim 13, comprising:
disposing the scaffold layer including a gradient dispersion of at least a portion of the anti-dendrite functional layer.

18. An electric vehicle, comprising:
a solid electrolyte having a first side and a second side to transfer ions between the first side and the second side, the solid electrolyte arranged within a cavity of a battery cell;
a cathode disposed within the cavity along the first side of the solid electrolyte, the cathode electrically coupled with a positive terminal;
an anti-dendrite functional layer disposed within the cavity along the second side of the solid electrolyte, the anti-dendrite functional layer having a first side and a second side, the first side of the anti-dendrite functional layer in contact with the second side of the solid electrolyte, wherein:
 the anti-dendrite functional layer forms to form an alloy with lithium material received from the cathode through the solid electrolyte during operation; and
a scaffold layer disposed within the cavity along the second side of the anti-dendrite functional layer, the scaffold layer electrically coupled with and directly contacting a negative terminal, wherein:
 the scaffold layer comprises a carbon-based composite material and a binding agent; and
 the scaffold layer bonds with the anti-dendrite functional layer by a material of the anti-dendrite functional layer being intercalated with the carbon-based composite material of the scaffold layer.

19. The electric vehicle of claim 18, wherein:
the scaffold layer has a first side and a second side, the first side of the scaffold layer in contact with the second side of the anti-dendrite functional layer to receive the lithium material via the solid electrolyte; and
the battery cell further comprises a second anti-dendrite functional layer disposed within the cavity along the second side of the scaffold layer to prevent dendritic growth of the lithium material from the second side of the scaffold layer.

20. The electric vehicle of claim 18, the battery cell comprises a positive conductive layer disposed within the cavity and electrically coupled with the positive terminal; wherein the cathode has a first side and a second side, the first side of the cathode in contact with the solid electrolyte, and the second side of the cathode electrically in contact with the positive conductive layer.

\* \* \* \* \*